US012264025B2

(12) United States Patent
Cao et al.

(10) Patent No.: US 12,264,025 B2
(45) Date of Patent: Apr. 1, 2025

(54) ROLL REPLACING APPARATUS AND WINDING DEVICE

(71) Applicant: WUXI LEAD INTELLIGENT EQUIPMENT CO., LTD., Jiangsu (CN)

(72) Inventors: Er Cao, Jiangsu (CN); Xiaofei Yang, Jiangsu (CN)

(73) Assignee: WUXI LEAD INTELLIGENT EQUIPMENT CO., LTD., Jiangsu (CN)

( * ) Notice: Subject to any disclaimer, the term of this patent is extended or adjusted under 35 U.S.C. 154(b) by 211 days.

(21) Appl. No.: 17/799,971

(22) PCT Filed: Nov. 10, 2021

(86) PCT No.: PCT/CN2021/129787
§ 371 (c)(1),
(2) Date: Aug. 16, 2022

(87) PCT Pub. No.: WO2022/105654
PCT Pub. Date: May 27, 2022

(65) Prior Publication Data
US 2023/0331503 A1 Oct. 19, 2023

(30) Foreign Application Priority Data

Nov. 23, 2020 (CN) .......................... 202011318572.6
Oct. 27, 2021 (CN) .......................... 202122600211.7

(51) Int. Cl.
*B65H 19/18* (2006.01)
*B65H 19/10* (2006.01)
*B65H 19/20* (2006.01)

(52) U.S. Cl.
CPC ....... *B65H 19/1852* (2013.01); *B65H 19/102* (2013.01); *B65H 19/20* (2013.01);
(Continued)

(58) Field of Classification Search
CPC .. B65H 19/1852; B65H 19/102; B65H 19/20; B65H 2301/46174; B65H 2301/4633;
(Continued)

(56) References Cited

U.S. PATENT DOCUMENTS 4,392,912 A    7/1983  Horsley
4,543,149 A *  9/1985  Abe .................... B65H 19/1852
                                                  242/554.2

(Continued)

FOREIGN PATENT DOCUMENTS

CN    103407818 A    11/2013
CN    105668284 A     6/2016
(Continued)

OTHER PUBLICATIONS

Invitation pursuant to Rule 62a(1) EPC issued in corresponding European Patent Application No. 21893801.7 dated Jun. 7, 2024.
(Continued)

*Primary Examiner* — William A. Rivera
(74) *Attorney, Agent, or Firm* — Rivka Friedman

(57) ABSTRACT

A roll changing apparatus, a winding device, and a gluing device are disclosed in the present application. The roll changing apparatus includes an unwinding assembly including a first unwinding mechanism and a second unwinding mechanism; and a roll changing assembly including a first adsorption mechanism, a second adsorption mechanism, and a cutting mechanism. The cutting mechanism is used to cut off a first material strip between the second adsorption mechanism and a first adsorption area or a second material strip between the second adsorption mechanism and a second adsorption area.

20 Claims, 6 Drawing Sheets

(52) U.S. Cl.
CPC .............. *B65H 2301/46174* (2013.01); *B65H 2301/4633* (2013.01)

(58) Field of Classification Search
CPC ...... B65H 2301/46176; B65H 2406/34; B65H 19/123; Y02E 60/10
See application file for complete search history.

(56) References Cited

U.S. PATENT DOCUMENTS

| | | | | |
|---|---|---|---|---|
| 5,406,872 | A | * | 4/1995 | Conley, Jr. ............... D06H 7/02 83/636 |
| 7,875,138 | B2 | | 1/2011 | Yamada et al. |
| 2023/0123540 | A1 | * | 4/2023 | Cao ........................ B65H 19/30 242/532.3 |
| 2023/0173765 | A1 | * | 6/2023 | Michiels ............. B29C 66/5221 156/73.1 |
| 2023/0183037 | A1 | * | 6/2023 | Passarella .............. B65H 75/24 242/570 |
| 2023/0352718 | A1 | * | 11/2023 | Fan ..................... H01M 10/052 |
| 2024/0228087 | A1 | * | 7/2024 | Oumi ...................... G07F 11/04 |
| 2024/0262647 | A1 | * | 8/2024 | Tardy ................. B65H 19/1852 |
| 2024/0327161 | A1 | * | 10/2024 | Cheon ....................... B65C 9/42 |
| 2025/0011120 | A1 | * | 1/2025 | Ji .......................... B65H 19/20 |

FOREIGN PATENT DOCUMENTS

| | | |
|---|---|---|
| CN | 106115327 A | 11/2016 |
| CN | 207684579 U | 8/2018 |
| CN | 109399292 A | 3/2019 |
| CN | 208843397 U | 5/2019 |
| CN | 209635527 U | 11/2019 |
| CN | 110600812 A | 12/2019 |
| CN | 111924606 A | 11/2020 |
| CN | 112456199 A | 3/2021 |
| CN | 214114355 U | 9/2021 |
| DE | 36114264 A1 | 10/1987 |
| FR | 2692566 A3 | 12/1993 |
| JP | H0551156 A | 3/1993 |
| JP | 2003063704 A | 3/2003 |

OTHER PUBLICATIONS

Chinese Office Action issued in corresponding Chinese Patent Application No. 202122600211.7 dated Apr. 29, 2022.
Chinese Office Action issued in corresponding Chinese Patent Application No. 202011318572.6 dated Apr. 16, 2024.
International Search Report and the Written Opinion Dated Jan. 26, 2022 From the International Searching Authority Re. Application No. PCT/CN2021/129787 and Its Translation of Search Report Into English (2 Pages).
Extended European Search Report for EP 21893801.7 Mailed on Nov. 15, 2024.

\* cited by examiner

ROLL REPLACING APPARATUS AND WINDING DEVICE

CROSS-REFERENCE TO RELATED APPLICATION

This disclosure claims priorities to a Chinese patent application with an application date of Nov. 23, 2020, an application number of 202011318572.6, and an application title of "ROLL REPLACING APPARATUS AND WINDING DEVICE"; and a Chinese patent application with an application date of Oct. 27, 2021, an application number of 202122600211.7, and an application title of "ROLL REPLACING APPARATUS AND GLUING DEVICE"; which are incorporated by reference in the present application in their entirety.

BACKGROUND OF DISCLOSURE

Technical Field

The present application relates to a technical field of battery manufacturing, and specifically, to a roll replacing apparatus and a winding device.

Description of Prior Art

In a manufacturing process of lithium batteries, it is necessary to wind a plurality of winding material strips (such as a cathode sheet, a diaphragm, and an anode sheet) to form a battery cell. Before the winding material strip enters a winding device for winding, a filming process of attaching tapes to one side of the winding material strips needs to be carried out.

However, in the prior art, manual roll replacing is adopted. Personnel need to be assigned to be on duty during operation, so that the personnel on duty can replace a film reel in time after the film reel is used up, resulting in high labor cost, long downtime, and low production efficiency.

BRIEF SUMMARY OF DISCLOSURE

Based on this, it is necessary to provide a roll replacing apparatus and a winding device to improve the above-mentioned defects in view of problems of long downtime, low production efficiency, and high labor cost caused by a manual roll replacing method in the prior art.

A roll replacing apparatus, which comprises:
an unwinding assembly is used to unwind and output a first material strip and a second material strip downstream; and
a roll replacing assembly arranged downstream of the unwinding assembly and comprising a first adsorption mechanism, a second adsorption mechanism, and a cutting mechanism; the first adsorption mechanism comprises a first adsorption unit, and the first adsorption unit and the second adsorption mechanism are arranged along a first direction and configured such that at least one of them is able to approach or move away from another one along the first direction;
one side of the first adsorption unit facing the second adsorption mechanism is provided with a first adsorption area and a second adsorption area arranged along a second direction perpendicular to the first direction; the first adsorption area is used to adsorb the first material strip, and the second adsorption area is used to adsorb the second material strip; and the first adsorption unit is further configured to be movable along the second direction, and in a process of the first adsorption unit moving along the second direction, the first adsorption area and the second adsorption area are alternately alignable with the second adsorption mechanism in the first direction; and
the cutting mechanism is arranged upstream of the second adsorption mechanism and is used to cut off the first material strip between the second adsorption mechanism and the first adsorption area or the second material strip between the second adsorption mechanism and the second adsorption area.

According to an embodiment of the present application, the first adsorption unit comprises a first adsorption seat, and the second adsorption mechanism comprises a second adsorption seat; a first position and a second position are provided in the process of the first adsorption seat moving along the second direction;
when the first adsorption seat is located at the first position, the second adsorption seat is aligned with the first adsorption area in the first direction, and the cutting mechanism is used to cut off the first material strip clamped tightly by the first adsorption seat and the second adsorption seat approaching each other along the first direction, and the second adsorption seat is able to adsorb the cut-off first material strip; and
when the first adsorption seat is located at the second position, the second adsorption seat is aligned with the second adsorption area in the first direction, and the cutting mechanism is used to cut off the second material strip clamped tightly by the first adsorption seat and the second adsorption seat approaching each other along the first direction, and the second adsorption seat is able to adsorb the cut-off second material strip.

According to an embodiment of the present application, one side of the first adsorption seat facing the second adsorption seat is further provided with a third adsorption area and a fourth adsorption area; the third adsorption area is located upstream of the first adsorption area, and the fourth adsorption area is located upstream of the second adsorption area;
when the first adsorption seat is located at the first position, the cutting mechanism is able to cut off the first material strip at a position between the first adsorption area and the third adsorption area; and
when the first adsorption seat is located at the second position, the cutting mechanism is able to cut off the second material strip at a position between the second adsorption area and the fourth adsorption area.

According to an embodiment of the present application, the roll replacing assembly further comprises a first strip-pressing mechanism and a second strip-pressing mechanism; the first strip-pressing mechanism has a first material-pressing end retractable along the first direction, and the second strip-pressing mechanism has a second material-pressing end retractable along the first direction;
when the first adsorption seat is located at the first position, the first material-pressing end is used to press the second material strip onto the second adsorption area tightly; and
when the first adsorption seat is located at the second position, the second material-pressing end is used to press the first material strip onto the first adsorption area tightly.

According to an embodiment of the present application, the roll replacing assembly further comprises a first cut-off knife arranged on the first strip-pressing mechanism and a second cut-off knife arranged on the second strip-pressing mechanism; and the first cut-off knife is used to cut off a starting end of the second material strip pressed tightly on the second adsorption area by the first material-pressing end; and
the second cut-off knife is used to cut off a starting end of the first material strip pressed tightly on the first adsorption area by the second material-pressing end.

According to an embodiment of the present application, the roll replacing assembly further comprises a mounting seat, and the first adsorption mechanism further comprises a sliding seat and a first driving member; the sliding seat is movably connected to the mounting seat along the second direction, and the first adsorption unit is arranged on the sliding seat; and the first driving member is arranged on the mounting seat and is connected to the sliding seat by transmission.

According to an embodiment of the present application, the first adsorption mechanism further comprises a second driving member; the first adsorption unit is movably connected to the sliding seat along the first direction, and the second driving member is fixedly arranged relative to the sliding seat and is connected to the first adsorption unit by transmission.

According to an embodiment of the present application, the roll replacing apparatus further comprises a connecting board, the connecting board is connected to the sliding seat; the unwinding assembly comprises a first unwinding mechanism and a second unwinding mechanism, the first unwinding mechanism is used to unwind and output the first material strip and the second unwinding mechanism is used to unwind and output the second material strip; and the first unwinding mechanism and the second unwinding mechanism are arranged on the connecting board along the second direction.

According to an embodiment of the present application, the roll replacing assembly further comprises a mounting seat, and the second adsorption mechanism further comprises a lifting seat and a third driving member; the lifting seat is movably connected to the mounting seat along the first direction, and the second adsorption seat is connected to the lifting seat; and the third driving member is mounted on the mounting seat and is connected to the lifting seat by transmission.

According to an embodiment of the present application, the cutting mechanism comprises a guiding seat, a cutter, and a fourth driving member; and the fourth driving member is mounted on the lifting seat or the mounting seat and is connected to the guiding seat by transmission to drive the guiding seat move along the first direction; and the cutter is mounted on the guiding seat; and in a process of the guiding seat moving along the first direction, the cutter is drivable to cut off the first material strip between the second adsorption seat and the first adsorption area or the second material strip between the second adsorption seat and the second adsorption area.

According to embodiment of the present application, the cutting mechanism further comprises a pressing block and an elastic member; the pressing block is movably connected to the guiding seat along the first direction and is located upstream of the cutter; and the elastic member is arranged between the pressing block and the guiding seat to provide a preload force that makes the pressing block have a tendency to approach the first adsorption seat along the first direction; and when the lifting seat approaches the first adsorption seat along the first direction, the pressing block is able to press the first material strip or the second material strip onto the first adsorption seat tightly.

According to an embodiment of the present application, the first adsorption unit comprises a first adsorption seat and a second adsorption seat arranged along the second direction; one side of the first adsorption seat facing the second adsorption mechanism has the first adsorption area, and one side of the second adsorption seat facing the second adsorption mechanism has the second adsorption area.

According to an embodiment of the present application, the roll replacing assembly further comprises a mounting seat, and the second adsorption mechanism comprises a tape adsorption driving member and a tape adsorption block; the tape adsorption driving member is arranged on the mounting seat and is drivingly connected to the tape adsorption block; and the tape adsorption driving member is used to drive the tape adsorption block to approach or move away from the first adsorption seat or the second adsorption seat along the first direction.

According to an embodiment of the present application, the roll replacing apparatus further comprises an anti-pasting assembly, and the anti-pasting assembly comprises a roller seat and an anti-pasting roller; the roller seat is movably connected to the mounting seat along the first direction, and the anti-pasting roller is rotatably connected to the roller seat and is located upstream and/or downstream of the tape adsorption block; and the roller seat is able to move to a pressing position along the first direction, and when the roller seat moves to the pressing position, the anti-pasting roller presses a material strip on the first adsorption seat or the second adsorption seat tightly.

According to an embodiment of the present application, the roll replacing assembly further comprises a mounting seat, and the roll replacing apparatus further comprises a cut-off assembly having a tape-cutting driving member, a cutting-knife seat, and a first cutting knife; and the tape-cutting driving member is arranged on the mounting seat and is drivingly connected to the cutting-knife seat to drive the cutting-knife seat to move along the first direction; the tape adsorption block is located at a downstream side of the cut-off assembly; and the first cutting knife is mounted on the cutting-knife seat and is located upstream of the tape adsorption block; and in a process of the cutting-knife seat moving along the first direction, the first cutting knife is able to be driven to cut off the first material strip on the first adsorption seat or the second material strip on the second adsorption seat.

According to an embodiment of the present application, an upstream side of the first adsorption seat is connected with a first supporting seat, and an upstream side of the second adsorption seat is connected with a second supporting seat;

the cut-off assembly further comprises a tape-pressing block and a first elastic member; and the tape-pressing block is movably connected to the cutting-knife seat along the first direction; and the first elastic member abuts between the tape-pressing block and the cutting-knife seat; and
the first adsorption unit is able to switch between a first position and a second position alternately when moving along the second direction; when the first adsorption unit is located at the first position, the second adsorption mechanism is opposite to the first adsorption seat in the first direction, and the tape-pressing block is opposite to the first supporting seat in the first direction; and when the first adsorption unit is located at the second position, the second adsorption mechanism is opposite to the second adsorption seat in the first direction, and the tape-pressing block is opposite to the second supporting seat in the first direction.

According to an embodiment of the present application, a first cutting groove for the first cutting knife to cut into is defined between the first supporting seat and the first adsorption seat; and a second cutting groove for the first cutting knife to cut into is defined between the second supporting seat and the second adsorption seat.

According to an embodiment of the present application, the roll replacing apparatus further comprises a mounting seat, and a first pressing assembly and a second pressing assembly both arranged on the mounting seat, and the first pressing assembly and the second pressing assembly are located at two sides of the second adsorption mechanism along the second direction respectively; the first pressing assembly has a first pressing end movable along the first direction, and the second pressing assembly has a second pressing end movable along the first direction; and the first adsorption unit is able to switch between a first position and a second position alternately when moving along the second direction; when the first adsorption unit is located at the first position, the second adsorption mechanism is opposite to the first adsorption seat in the first direction, and the second pressing end is opposite to the second adsorption seat in the first direction; and when the first adsorption unit is located at the second position, the second adsorption mechanism is opposite to the second adsorption seat in the first direction, and the first pressing end is opposite to the first adsorption seat in the first direction.

According to an embodiment of the present application, the unwinding assembly comprises a moving seat and the first adsorption mechanism fixed relative to the moving seat; the roll replacing apparatus further comprises a mounting seat, a base, and a roll-replacing driving member; the mounting seat is connected to the base, and the moving seat is movably connected to the base along the second direction; and the roll-replacing driving member is arranged on the base and is drivingly connected to the moving seat.

A winding device, which comprises the roll replacing apparatus as described in any one of the above-mentioned embodiments.

The above-mentioned roll replacing apparatus and the winding device are illustrated by taking the first material strip unwound and output by the first unwinding mechanism as a working material strip, and the second material strip unwound and output by the second unwinding mechanism as a standby material strip. At this time, the second adsorption seat is aligned with the first adsorption area of the first adsorption seat in the first direction. The first material strip unwound and output by the first unwinding mechanism passes between the second adsorption seat and the first adsorption area of the first adsorption seat to be transported downstream. The starting end of the second material strip unwound and output by the second unwinding mechanism is adsorbed and fixed in the second adsorption area of the first adsorption seat. When material rolls on the first unwinding mechanism are used up and need to be replaced, firstly, the first adsorption seat and the second adsorption seat approach each other to clamp the first material strip tightly, the cutting mechanism cuts off the first material strip, and the second adsorption seat adsorbs the cut-off first material strip. And then, the first adsorption seat and the second adsorption seat are separated from each other, and the first adsorption seat moves along the second direction until the second adsorption area aligns with the second adsorption seat in the first direction. And the first adsorption seat and the second adsorption seat approach each other to paste the cut-off first material strip adsorbed by the second adsorption seat onto the starting end of the second material strip adsorbed by the second adsorption area. Finally, the second adsorption area of the first adsorption seat releases adsorption of the second material strip, and the second adsorption seat releases adsorption of the cut-off first material strip, and the first adsorption seat and the second adsorption seat move away from each other, so that the second material strip follows the cut-off first material strip to pass between the first adsorption seat and the second adsorption seat to be transported downstream, that is to say, roll replacing is realized.

In this way, the roll replacing apparatus of the present application can realize automatic switching between the first material strip and the second material strip (i.e., automatic roll replacing). Compared with a manual roll replacing method adopted in the prior art, the present application greatly shortens downtime and improves production efficiency, and there is no need for personnel to be on duty, which reduces staffing and labor cost.

The above-mentioned roll replacing apparatus and winding device are illustrated by taking the first material strip as a working material strip and the second material strip as a standby material strip. At this time, the moving seat is located at the first position, the cut-off assembly and the tape adsorption assembly are opposite to the first adsorption seat in the second direction, and the first material strip unwound and output by the first unwinding assembly passes between the cut-off assembly, the tape adsorption end of the tape adsorption assembly, and the first adsorption seat to be transported downstream. A starting end of the second material strip unwound and output by the second unwinding assembly is adsorbed and fixed in the second adsorption seat. When material rolls on the first unwinding assembly are used up and need to be replaced, firstly, the tape adsorption end of the tape adsorption assembly moves to the first adsorption seat along the second direction until the first material strip is pressed tightly; and the cut-off assembly cuts off the first material strip, and after cutting off the first material strip, the tape adsorption end of the tape adsorption assembly moves away from the first adsorption seat along the second direction to reset; and at this time, a cut-off end of a cut-off first material strip is adsorbed in the tape adsorption end. And then, the moving seat moves to the second position along the first direction relative to the mounting seat, at this time, the tape adsorption end of the tape adsorption assembly and the cut-off assembly are opposite to the second adsorption seat in the second direction. At this time, the tape adsorption end of the tape adsorption assembly moves to the second adsorption seat along the second direction until the cut-off end of the first material strip and the starting end of the second material strip are pressed together on the second adsorption seat tightly, so that the cut-off end of the first material strip and the starting end of the second material strip are pasted to each other. Finally, the tape adsorption end of the tape adsorption assembly releases adsorption of the first material strip and moves away from the second adsorption seat along the second direction to reset; and the second adsorption seat also releases adsorption of the second material strip to make the second material strip follow the cut-off first material strip to pass between the tape adsorption end, the cut-off assembly, and the second adsorption seat to be transported downstream, that is to say, roll replacing is realized.

In this way, the roll replacing apparatus of the present application can realize automatic switching of the first material strip and the second material strip. Compared with a manual roll replacing method adopted in the prior art, the present application greatly shortens downtime and improves production efficiency, and there is no need for personnel to be on duty, which reduces staffing and thus lowers labor cost.

BRIEF DESCRIPTION OF DRAWINGS

In order to more clearly illustrate embodiments of the present application or technical solutions in the prior art, accompanying drawings that need to be used in description of the embodiments or the prior art will be briefly introduced as follows. Obviously, drawings in following description are only the embodiments of the present application. For those skilled in the art, other drawings can also be obtained according to the disclosed drawings without creative efforts.

DETAILED DESCRIPTION OF PREFERRED EMBODIMENTS

Figure 1:
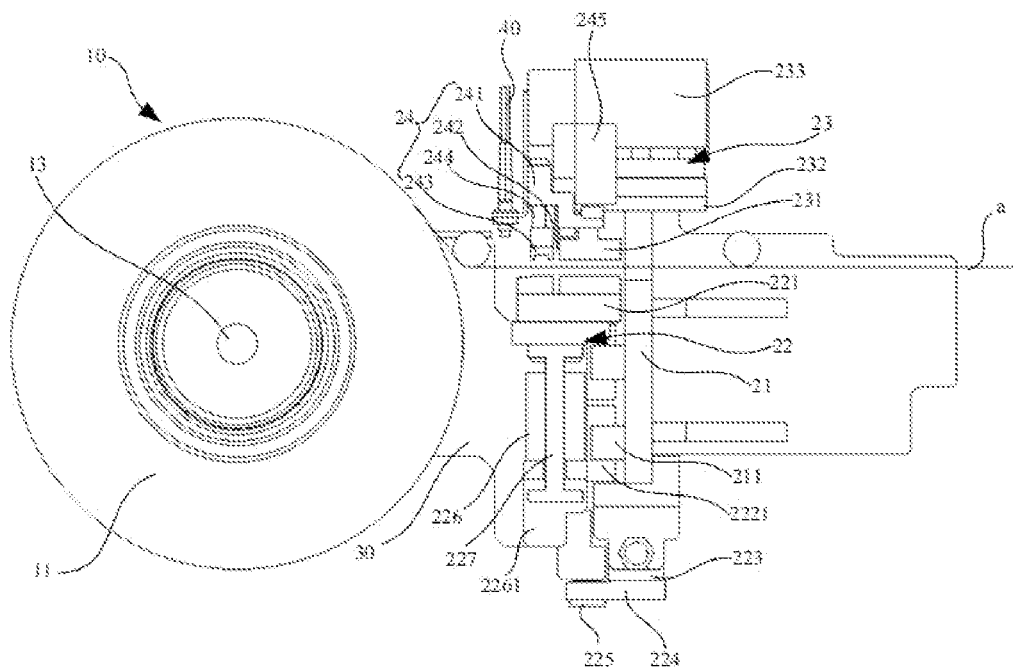
FIG. 1 is a schematic structural diagram of a roll replacing apparatus in an embodiment of the present application.

In order to make the above-mentioned objects, features, and advantages of the present application more obvious and understandable, specific embodiments of the present application are described in detail below in combination with accompanying drawings. Many specific details are set forth in following description to facilitate full understanding of the present application. However, the present application can be implemented in many other ways different from those described here. Those skilled in the art can make similar improvements without violating connotation of the present application. Therefore, the present application is not limited by the specific embodiments disclosed below.

In the description of the present application, it should be understood that terms of indicated orientation or positional relationship, such as "center", "longitudinal", "transverse", "length", "width", "thickness", "up", "down", "front", "back", "left", "right", "vertical", "horizontal", "top", "bottom", "inside", "outside", "clockwise", "counterclockwise", "axial", "radial", "circumferential", etc. are based on orientation or positional relationship shown in the accompanying drawings. They are only for convenience of describing the present application and simplifying the description, and do not indicate or imply that a device or element must have a specific orientation, be constructed and operated in a specific orientation. Therefore, they cannot be understood as a limitation of the present application.

In addition, terms "first" and "second" are only used for descriptive purposes, and should not be understood as indicating or implying relative importance or implying a number of indicated technical features. So a feature limited with "first", "second" may expressly or implicitly include at least one of that feature. In the description of the present application, "plurality" means at least two, such as two, three, etc., unless expressly and specifically defined otherwise.

In the present application, unless otherwise expressly specified and limited, terms "mounted", "be connected with", "be connected to", "fixed" and other terms should be interpreted in a broad sense, for example, it can be a fixed connection, a detachable connection, or an integrated; it can be a mechanical connection or an electrical connection; it can be a direct connection or an indirect connection through an intermediate medium; it may be connection within the two elements or an interaction relationship between the two elements, unless explicitly defined otherwise. For those of ordinary skill in the art, the specific meanings of the above-mentioned terms in the present application can be understood according to specific situations.

In the present application, unless otherwise expressly specified and limited, a first feature is "above" or "below" a second feature may be that the first feature is in direct contact with the second feature, or the first and second features may be in indirect contact through an intermediate medium. Moreover, the first feature is "above", "on", and "in an upper surface of" the second feature, may be that the first feature is directly above or obliquely above the second feature, or only indicates that a horizontal height of the first feature is higher than a horizontal height of the second feature. The first feature is "below", "under", and "in a lower surface" of the second feature may be that the first feature is directly below or obliquely below the second feature, or simply means that the horizontal height of the first feature is less than the horizontal height of the second feature.

It should be noted that when a component is called "fixed to" or "set to" another component, it can be directly on another component or there can be an intermediate component. When a component is considered to be "connected" to another component, it can be directly connected to another component or there may be intermediate components at a same time. The terms "vertical", "horizontal", "up", "down", "left", "right" and similar expressions used here are for illustrative purposes only and do not mean that they are the only embodiments.

Figure 2:
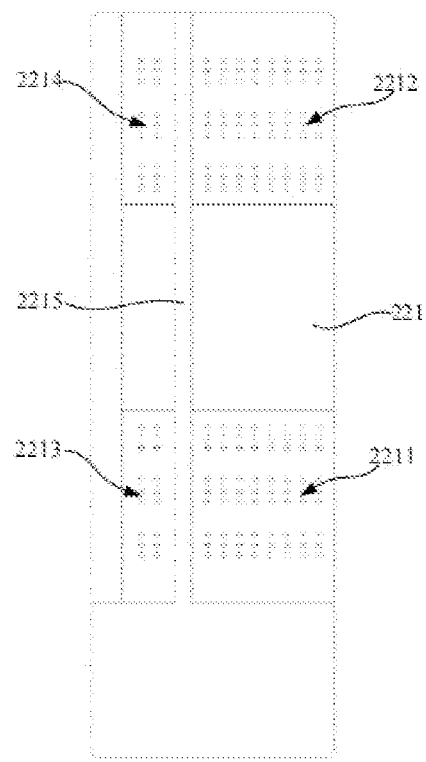
FIG. 2 is a top view of a first adsorption seat of a first adsorption mechanism of a roll replacing assembly of the roll replacing apparatus shown in FIG. 1.

Referring to FIG. 1 and FIG. 2, a roll replacing apparatus is provided in an embodiment of the present application. The roll replacing apparatus includes an unwinding assembly 10 and a roll replacing assembly arranged downstream of the unwinding assembly 10. The unwinding assembly 10 includes a first unwinding mechanism 11 for unwinding a first material strip a and a second unwinding mechanism 12 for unwinding a second material strip. The first material strip a unwound and output by the first unwinding mechanism 11 or the second material strip unwound and output by the second unwinding mechanism 12 is able to pass through the roll replacing assembly to be transported downstream. The roll replacing assembly is used to realize switching between the first material strip a and the second material strip, that is to say, when unwinding of the first material strip a on the first unwinding mechanism 11 is completed, the roll replacing assembly switches the second material strip unwound and output by the second unwinding mechanism 12 to be transported downstream; and when unwinding of the second material strip of the second unwinding mechanism 12 is completed, the roll replacing assembly switches the first material strip a unwound and output by the first unwinding mechanism 11 to be transported downstream.

The roll replacing assembly includes a mounting seat 21, a first adsorption mechanism 22, a second adsorption mechanism 23, and a cutting mechanism 24. The first adsorption mechanism 22, the second adsorption mechanism 23, and the cutting mechanism 24 are arranged on the mounting seat 21. The first adsorption mechanism 22 includes a first adsorption seat 221. The second adsorption mechanism 23 includes a second adsorption seat 231. The first adsorption seat 221 and the second adsorption seat 231 are arranged along a first direction, so that the first material strip a unwound and output by the first unwinding mechanism 11 or the second material strip unwound and output by the second unwinding mechanism 12 passes between the first adsorption seat 221 and the second adsorption seat 231 to be transported downstream. The first adsorption seat 221 and the second adsorption seat 231 are configured such that at least one of them is able to approach another or move away from another along the first direction, so that when the first adsorption seat 221 and the second adsorption seat 231 approach each other, the first material strip a or the second material strip passing between the first adsorption seat 221 and the second adsorption seat 231 can be clamped tightly by the first adsorption seat 221 and the second adsorption seat 231.

One side of the first adsorption seat 221 facing the second adsorption seat 231 is provided with a first adsorption area 2211 and a second adsorption area 2212, both arranged along a second direction perpendicular to the first direction. The first adsorption area 2211 is used to adsorb the first material strip a, and the second adsorption area 2212 is used to adsorb the second material strip. And the first adsorption seat 221 is also configured to be movable along the second direction perpendicular to the first direction. And in a process of the first adsorption seat 221 moving along the second direction, the first adsorption area 2211 and the second adsorption area 2212 may be alternately aligned with the second adsorption seat 231 in the first direction. When the first adsorption area 2211 is aligned with the second adsorption seat 231 in the first direction, the first adsorption seat 221 and the second adsorption seat 231 approach each other along the first direction, and the first material strip a passing between the first adsorption area 2211 and the second adsorption seat 231 can be clamped tightly by the first adsorption seat 221 and the second adsorption seat 231. When the second adsorption area 2212 is aligned with the second adsorption seat 231 in the first direction, the first adsorption seat 221 and the second adsorption seat 231 approach each other along the first direction, and the second material strip passing between the second adsorption area 2212 and the second adsorption seat 231 can be clamped tightly by the first adsorption seat 221 and the second adsorption seat 231.

The cutting mechanism 24 is arranged upstream of the first adsorption seat 221 and is used to cut off the first material strip a between the second adsorption seat 231 and the first adsorption area 2211 of the first adsorption seat 221, or the second material strip between the second adsorption seat 231 and the second adsorption area 2212 of the first adsorption seat 221. Optionally, the first material strip and the second material strip may be tapes.

The above-mentioned roll replacing apparatus is illustrated by taking the first material strip a unwound and output by the first unwinding mechanism 11 as a working material strip, and the second material strip unwound and output by the second unwinding mechanism 12 as a standby material strip. At this time, the second adsorption seat 231 is aligned with the first adsorption area 2211 of the first adsorption seat 221 in the first direction. The first material strip a unwound and output by the first unwinding mechanism 11 passes between the second adsorption seat 231 and the first adsorption area 2211 of the first adsorption seat 221 to be transported downstream. A starting end of the second material strip unwound and output by the second unwinding mechanism 12 is adsorbed and fixed in the second adsorption area 2211 of the first adsorption seat 221. When material rolls on the first unwinding mechanism 11 are used up and need to be replaced, firstly, the first adsorption seat 221 and the second adsorption seat 231 approach each other to clamp the first material strip a tightly, and the cutting mechanism 24 cuts off the first material strip a, and the second adsorption seat 231 adsorbs the cut-off first material strip a. And then, the first adsorption seat 221 and the second adsorption seat 231 are separated from each other, and the first adsorption seat 221 moves along the second direction until the second adsorption area 2212 aligns with the second adsorption seat 231 in the first direction. The first adsorption seat 221 and the second adsorption seat 231 approach each other to paste the cut-off first material strip a adsorbed by the second adsorption seat 231 onto the starting end of the second material strip adsorbed by the second adsorption area 2212. Finally, the second adsorption area 2212 of the first adsorption seat 221 releases the adsorption of the second material strip; the second adsorption seat 231 releases the adsorption of the cut-off first material strip a; and the first adsorption seat 221 and the second adsorption seat 231 move away from each other, so that the second material strip follows the cut-off first material strip a to pass between the first adsorption seat 221 and the second adsorption seat 231 to be transported downstream, that is to say, roll replacing is realized.

In this way, the roll replacing apparatus of the present application can realize automatic switching between the first material strip a and the second material strip (i.e., automatic roll replacing). Compared with a manual roll replacing method adopted in the prior art, the present application greatly shortens downtime and improves production efficiency, and there is no need for personnel to be on duty, which reduces staffing and thus lowers labor cost.

It should be noted that the first material strip a and the second material strip can be tapes, therefore, in a process of performing roll replacing, a starting end of the first material strip a is able to be pasted to a cut-off end of the second material strip, or the starting end of the second material strip is pasted to a cut-off end of the first material strip a. Of course, in other embodiments, the first material strip a and the second material strip may be not tapes. At this time, the starting end of the first material strip a on the material roll is pasted with double-sided tapes to facilitate pasting of the starting end of the first material strip a and the cut-off end of the second material strip in the process of performing roll replacing. The starting end of the second material strip on a material roll is pasted with double-sided tapes to facilitate pasting of the starting end of the second material strip and the cut-off end of the first material strip a in the process of performing roll replacing.

It should also be noted that, specifically, in the embodiment shown in FIG. 1, the first direction is an up-down direction, and the second direction is a direction perpendicular to the page.

In the embodiment of the present application, a first position and a second position are provided in a process of the first adsorption seat 221 moving along the second direction.

When the first adsorption seat 221 is located at the first position, the second adsorption seat 231 is aligned with the first adsorption area 2211 in the first direction. The cutting mechanism 24 is used to cut off the first material strip a, which is clamped tightly by the first adsorption seat 221 and the second adsorption seat 231 approaching each other along the first direction. And the second adsorption seat 231 is able to adsorb the cut-off first material strip a. In this way, if the material rolls on the first unwinding mechanism 11 are used up and need to be replaced, firstly, the first adsorption seat 221 and the second adsorption seat 231 approach each other to tightly clamp the first material strip a between the first adsorption area 2211 of the first adsorption seat 221 and the second adsorption seat 231, and the cutting mechanism 24 cuts off the first material strip a, and the second adsorption seat 231 adsorbs the cut-off first material strip a. Then, the first adsorption seat 221 and the second adsorption seat 231 move away from each other, and the first adsorption seat 221 moves along the second direction until the second adsorption area 2212 aligns with the second adsorption seat 231 in the first direction. And then, the second adsorption seat 231 and the first adsorption seat 221 approach each other to paste the cut-off first material strip a adsorbed by the second adsorption seat 231 onto the starting end of the second material strip adsorbed by the second adsorption area 2212. Finally, the second adsorption area 2212 of the first adsorption seat 221 releases the adsorption of the second material strip; and the second adsorption seat 231 releases the adsorption of the cut-off first material strip a; and the first adsorption seat 221 and the second adsorption seat 231 move away from each other, so that the second material strip is able to follow the cut-off first material strip a to pass between the first adsorption seat 221 and the second adsorption seat 231 to be transported downstream. It can be understood that the adsorption of the second adsorption seat 231 to the first material strip a can be performed before the cutting mechanism 24 cuts off the first material strip a, or after the cutting mechanism 24 cuts off the first material strip a, which is not limited here.

When the first adsorption seat 221 is located at the second position, the second adsorption seat 231 is aligned with the second adsorption area 2212 in the first direction. And the cutting mechanism 24 is used to cut off the second material strip clamped tightly by the first adsorption seat 221 and the second adsorption seat 231 approaching each other along the first direction. The second adsorption seat 231 is able to adsorb the cut-off second material strip. In this way, if the material rolls on the second unwinding mechanism 12 are used up and need to be replaced, firstly, the first adsorption seat 221 and the second adsorption seat 231 approach each other to clamp the second material strip between the second adsorption area 2212 of the first adsorption seat 221 and the second adsorption seat 231. And the cutting mechanism 24 cuts off the second material strip, and the second adsorption seat 231 adsorbs the cut-off second material strip. Then, the first adsorption seat 221 and the second adsorption seat 231 move away from each other, and the first adsorption seat 221 moves along the second direction until the first adsorption area 2211 aligns with the second adsorption seat 231 in the first direction. And then, the second adsorption seat 231 and the first adsorption seat 221 approach each other to paste the cut-off second material strip adsorbed by the second adsorption seat 231 onto the starting end of the first material strip a adsorbed by the first adsorption area 2211. Finally, the first adsorption area 2211 of the first adsorption seat 221 releases the adsorption of the first material strip a, and the second adsorption seat 231 releases the adsorption of the cut-off second material strip. The first adsorption seat 221 and the second adsorption seat 231 move away from each other, so that the first material strip a follows the cut-off second material strip to pass between the first adsorption seat 221 and the second adsorption seat 231 to be transported downstream. It should be understood that the adsorption of the second adsorption seat 231 to the second material strip is able to be performed before the cutting mechanism 24 cuts off the second material strip, or after the cutting mechanism 24 cuts off the second material strip, which is not limited here.

In some embodiments, the side of the first adsorption seat 221 facing the second adsorption seat 231 is further provided with a third adsorption area 2213 and a fourth adsorption area 2214. The third adsorption area 2213 is located upstream of the first adsorption area 2211, and the fourth adsorption area 2214 is located upstream of the second adsorption area 2212.

When the first adsorption seat 221 is located at the first direction, the cutting mechanism 24 is able to cut off the first material strip a at a position between the first adsorption area 2211 and the third adsorption area 2213, so that one end of the cut-off first material strip a connected to the material roll is adsorbed by the third adsorption area 2213. When the first adsorption seat 221 is located at the second position, the cutting mechanism 24 is able to cut off the second material strip at a position between the second adsorption area 2212 and the fourth adsorption area 2214, so that one end of the cut-off second material strip connected to the material roll is adsorbed by the fourth adsorption area 2214.

Figure 6:
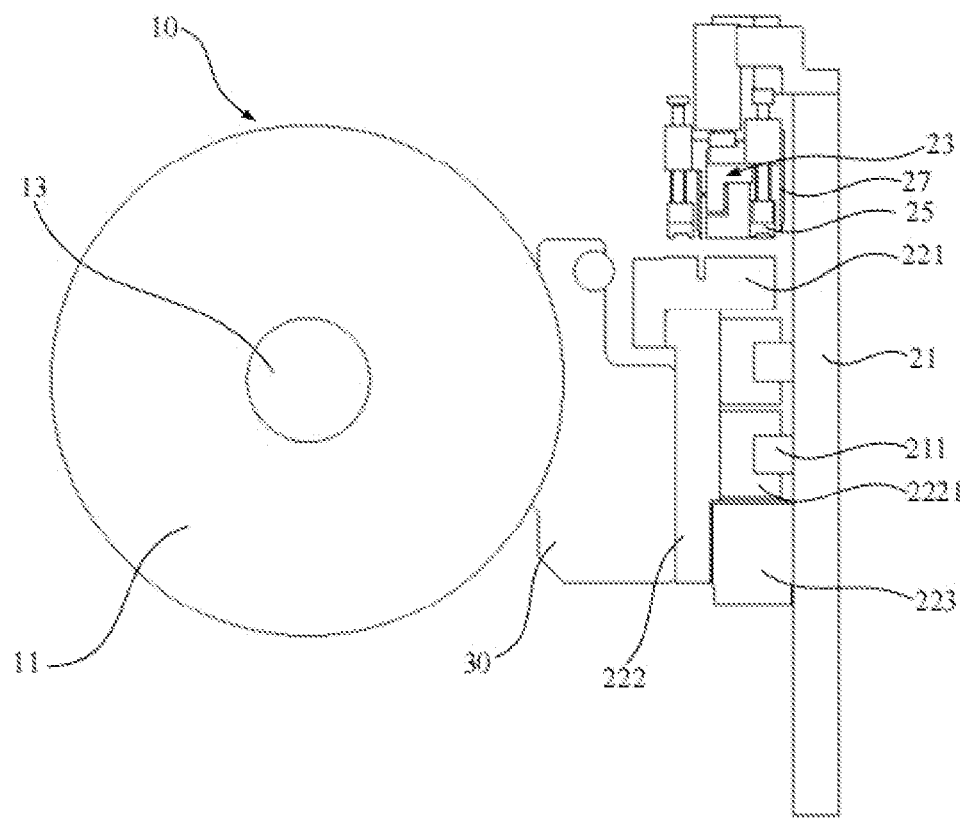
FIG. 6 is a schematic structural diagram of a roll replacing apparatus in another embodiment of the present application (some elements are omitted).
Figure 7:
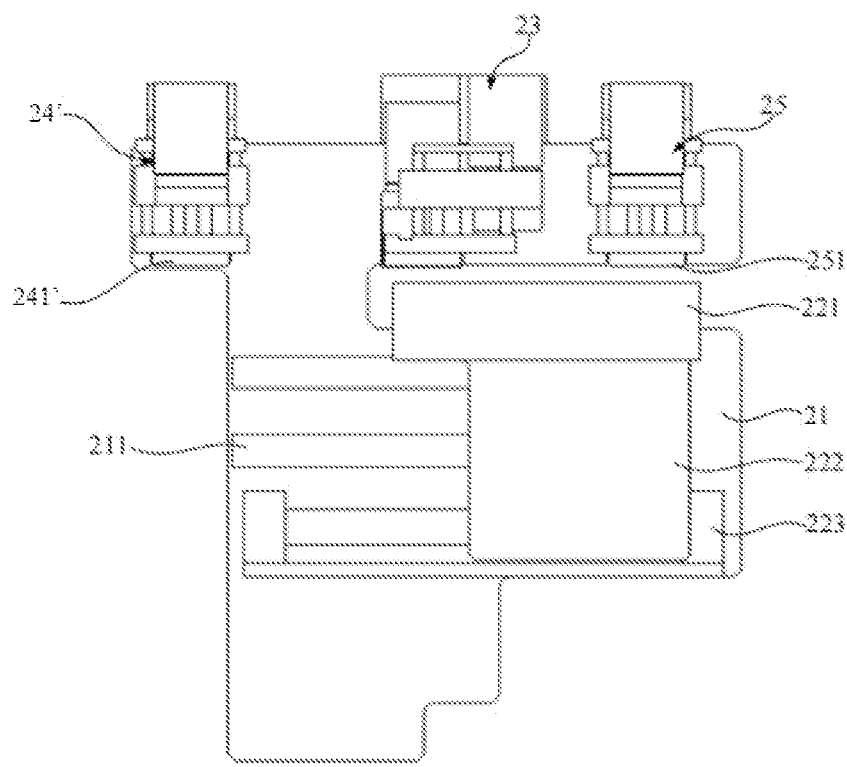
FIG. 7 is a left side view of the roll replacing apparatus shown in FIG. 6 (some elements are omitted).
Figure 8:
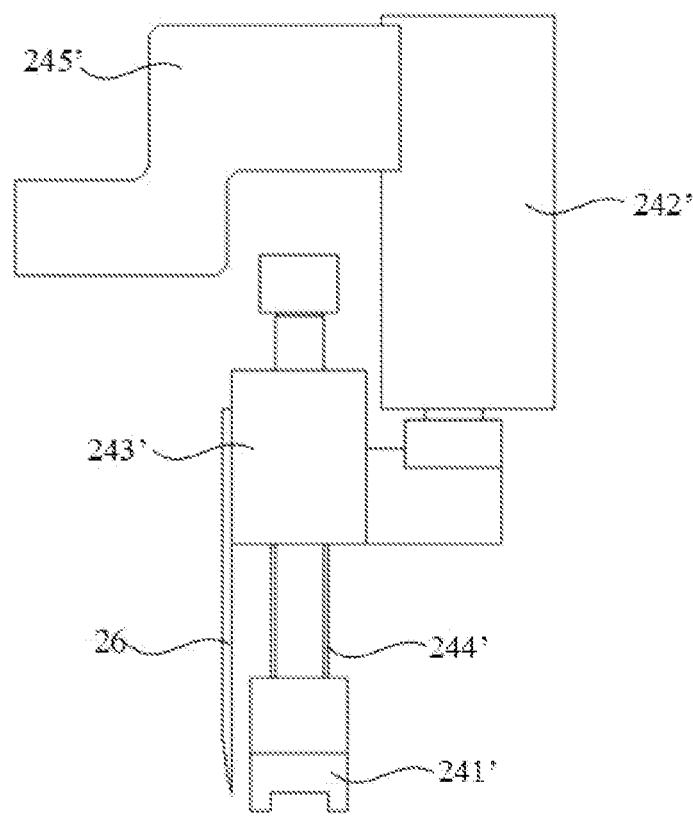
FIG. 8 is a schematic structural diagram of a first strip-pressing mechanism of the roll replacing apparatus shown in FIG. 6.

Please refer to FIG. 6, FIG. 7, and FIG. 8, in another embodiment, the roll replacing assembly further includes a first strip-pressing mechanism 24' and a second strip-pressing mechanism 25 both arranged on the mounting seat 21. The first strip-pressing mechanism 24' has a first material-pressing end 241' retractable along the first direction, and the second strip-pressing mechanism 25 has a second material-pressing end 251 retractable along the first direction.

When the first adsorption seat 221 is located at the first position, the first material-pressing end 241' is used to press the second material strip onto the second adsorption area 2212 tightly. In this way, when the roll replacing is completed, the first material strip a passes between the first adsorption seat 221 and the second adsorption seat 231 to be transported downstream. In order to prepare for roll replacing for a next time, the starting end of the second material strip unwound and output by the second unwinding mechanism 12 can be pressed tightly on the second adsorption area 2212 by the first material-pressing end 241', so as to prevent using the second adsorption area 2212 to adsorb the second material strip all the time. It is only necessary to use the second adsorption area 2212 to adsorb the second material strip during a roll replacing process, which reduces a loss of gas source and has an effect of energy saving.

When the first adsorption seat 221 is located at the second position, the second material-pressing end 251 is used to press the first material strip tightly onto the first adsorption area 2211. In this way, when the roll replacing is completed, the second material strip passes between the first adsorption seat 221 and the second adsorption seat 231 to be transported downstream. In order to prepare for roll replacing for a next time, the starting end of the first material strip a unwound and output by the first unwinding mechanism 11 can be pressed tightly on the first adsorption area 2211 by the second material-pressing end 251, so as to prevent using the first adsorption area 2211 to adsorb the first material strip a all the time. It is only necessary to use the first adsorption area 2211 to adsorb the first material strip a during the roll replacing process, which reduces the loss of gas source and has the effect of energy saving.

Specifically, in the embodiment, the first strip-pressing mechanism 24' includes a first strip-pressing driving member 242' and a first strip-pressing block. The first strip-pressing driving member 242' is mounted on the mounting seat 21, and the first strip-pressing block is mounted on a driving end of the first strip-pressing driving member 242' and serves as the first material-pressing end 241' of the first strip-pressing mechanism. The first strip-pressing driving member 242' is used to drive the first strip-pressing block to reciprocate along the first direction. The first strip-pressing block can make the second material strip be pressed tightly on the second adsorption area 2212 in a process of the first strip-pressing block moving along the first direction. Optionally, the first strip-pressing driving member 242' can be an air cylinder. The first strip-pressing driving member 242' can be mounted on the mounting seat 21 through a first base 245'.

Specifically, in the embodiment, the second strip-pressing mechanism 25 includes a second strip-pressing driving member and a second strip-pressing block. The second strip-pressing driving member is mounted on the mounting seat 21, and the second strip-pressing block is mounted on a driving end of the second strip-pressing driving member and serves as the second material-pressing end 251 of the second strip-pressing mechanism. The second strip-pressing driving member is used to drive the second strip-pressing block to reciprocate along the first direction. The second strip-pressing block can make the first material strip be pressed tightly on the first adsorption area 2211 in a process of the second strip-pressing block moving along the first direction. Optionally, the second strip-pressing driving member can be an air cylinder. The second strip-pressing driving member is able to be mounted on the mounting seat 21 through a second base.

Specifically, in the embodiment, the roll replacing assembly further includes a first cut-off knife 26 arranged on the first strip-pressing mechanism 24'. And the first cut-off knife 26 is used to cut off the starting end of the second material strip being pressed tightly on the second adsorption area 2212 by the first material-pressing end 241', so that the starting end of the second material strip is kept smooth to facilitate pasting with the cut-off end of the first material strip a during the roll replacing, and a strip-connecting effect is improved.

The roll replacing assembly further includes a second cut-off knife 27 arranged on the second strip-pressing mechanism 25, and the second cut-off knife 27 is used to cut off the starting end of the first material strip a being pressed tightly on the first adsorption area 2211 by the second material-pressing end 251, so that the starting end of the first material strip a is kept smooth to facilitate pasting with the cut-off end of the second material strip during the roll replacing, and the strip-connecting effect is improved.

More specifically, the first strip-pressing mechanism 24' further includes a first moving seat 243' and a first elastic buffer 244'. The first moving seat 243' is connected to the driving end of the first strip-pressing driving member 242', and the first strip-pressing driving member 242' is used to drive the first moving seat 243' to reciprocate along the first direction. The first strip-pressing block is movably connected to the first moving seat 243' along the first direction. The first elastic buffer 244' is arranged between the first moving seat 243' and the first strip-pressing block to provide a preload force that makes the first strip-pressing block have a tendency to move away from the first moving seat 243' along the first direction. In a process of the first strip-pressing block moving along the first direction with the first moving seat 243', the second material strip can be pressed tightly on the second adsorption area 2212. At a same time, the first elastic buffer 244' can be compressed to play a buffer role.

The first cut-off knife 26 is mounted on the first moving seat 243' of the first strip-pressing mechanism 24' to move synchronously with the first moving seat 243' along the first direction. In this way, when the second material strip needs to be pressed tightly, firstly, the first strip-pressing driving member 242' drives the first moving seat 243' to move and approach the second adsorption area 2212 along the first direction, so that the first strip-pressing block is driven to contact the second material strip, so as to press the second material strip tightly on the second adsorption area 2212. And then, the first strip-pressing driving member 242' continues to drive the first moving seat 243' to move and approach the second adsorption area 2212 along the first direction, so that the first elastic buffer 244' is compressed to drive the first cut-off knife 26 to continue moving to the second material strip until the first cut-off knife 26 cuts off the starting end of the second material strip. Optionally, the first elastic buffer 244' can be a spring. The first strip-pressing block can be mounted on the first moving seat 243' through a guiding rod and a guiding sleeve to make the first strip-pressing block be movable along the first direction relative to the first moving seat 243' under a guidance of the guiding rod and the guiding sleeve.

The second strip-pressing mechanism 25 further includes a second moving seat and a second elastic buffer. The second moving seat is connected to the driving end of the second strip-pressing driving member, and the second strip-pressing driving member is used to drive the second moving seat to reciprocate along the first direction. The second strip-pressing block is movably connected to the second moving seat along the first direction. And the second elastic buffer is arranged between the second moving seat and the second strip-pressing block to provide a preload force that makes the second strip-pressing block have a tendency to move away from the second moving seat along the first direction. In a process of the second strip-pressing block moving along the first direction with the second moving seat, the first material strip a can be pressed tightly on the first adsorption area 2211. At a same time, the second elastic buffer can be compressed to play a buffer role.

The second cut-off knife 27 is mounted on the second moving seat of the second strip-pressing mechanism 25 to move synchronously with the second moving seat along the first direction. In this way, when the first material strip a needs to be pressed tightly, firstly, the second strip-pressing driving member drives the second moving seat to move and approach the first adsorption area 2211 along the first direction, so that the second strip-pressing block is driven to contact the first material strip a to press the first material strip a tightly on the first adsorption area 2211. And then, the second strip-pressing driving member continues to drive the second moving seat to move and approach the first adsorption area 2211 along the first direction, so that the second elastic buffer is compressed to drive the second cut-off knife 27 to continue moving to the first material strip a until the second cut-off knife 27 cuts off the starting end of the first material strip a. Optionally, the second elastic buffer can be a spring. The second strip-pressing block is able to be mounted on the second moving seat through a guiding rod and a guiding sleeve, so as to make the second strip-pressing block be movable along the first direction relative to the second moving seat under a guidance of the guiding rod and the guiding sleeve.

It should be noted that in other embodiments, the first cut-off knife 26 can be separately provided with a driving structure to drive the first cut-off knife 26 to move along the first direction, thereby cutting off the starting end of the second material strip.

Of course, the second cut-off knife 27 can also be separately provided with a driving structure to drive the second cut-off knife 27 to move along the first direction, thereby cutting off the starting end of the first material strip a.

Figure 3:
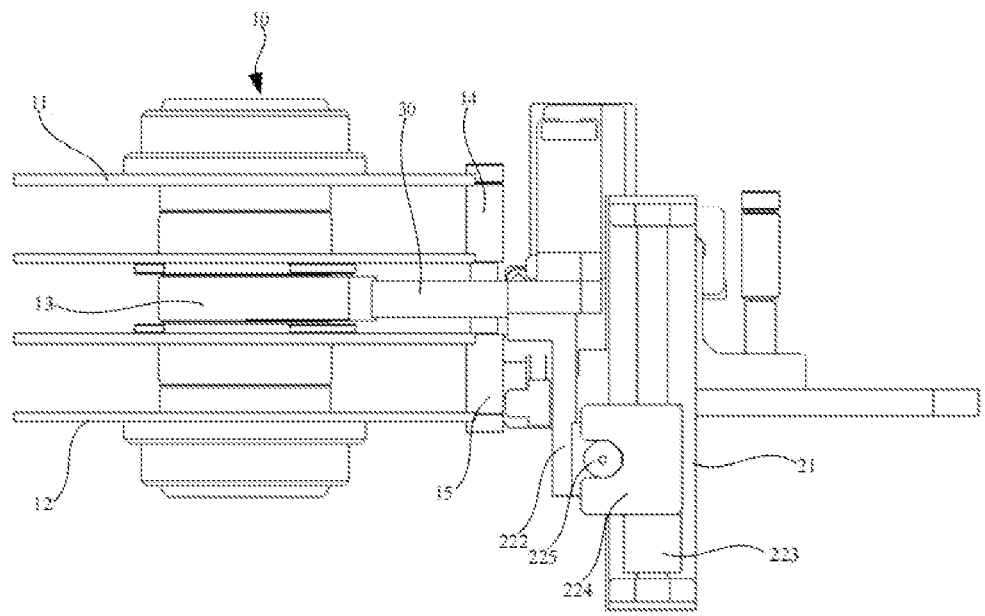
FIG. 3 is a bottom view of the roll replacing apparatus shown in FIG. 1.
Figure 4:
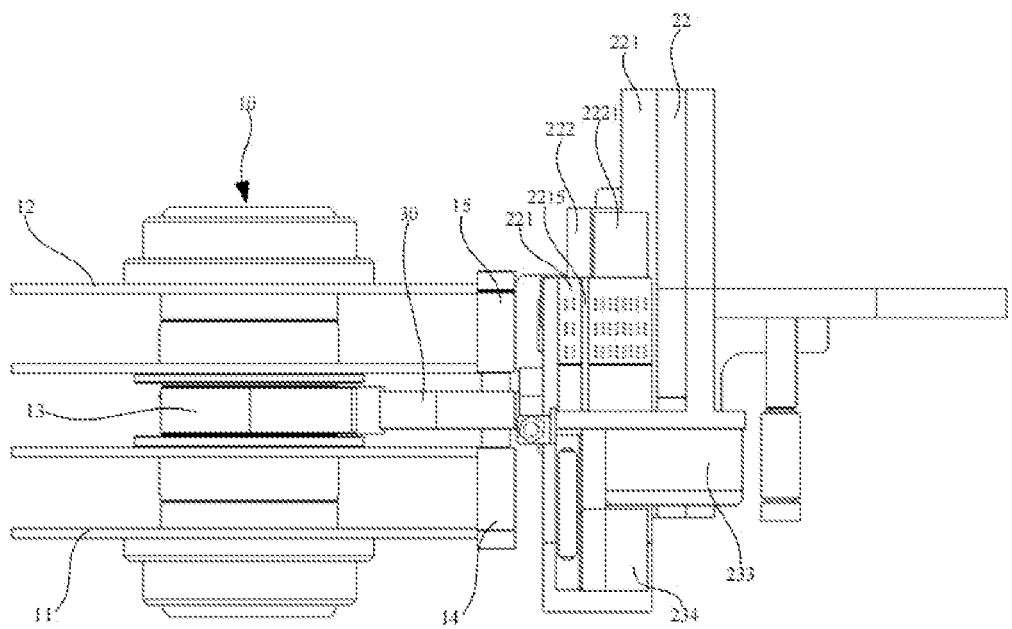
FIG. 4 is a top view of the roll replacing apparatus shown in FIG. 1.

Please refer to FIG. 1, FIG. 3, and FIG. 4, in the embodiment of the present application, the first adsorption mechanism 22 further includes a sliding seat 222 and a first driving member 223. The sliding seat 222 is movably connected to the mounting seat 21 along the second direction, and the first adsorption seat 221 is arranged on the sliding seat 222. The first driving member 223 is arranged on the mounting seat 21 and is connected to the sliding seat 222 by transmission, so as to drive the sliding seat 222 to move along the second direction, thereby driving the first adsorption seat 221 move along the second direction, so that the first adsorption area 2211 and the second adsorption area 2212 of the first adsorption seat 221 are alternately aligned with the second adsorption seat 231 in the first direction. Optionally, the first driving member 223 can be an air cylinder.

Specifically, in the embodiment, a sliding block 2221 is arranged on the sliding seat 222, and a sliding rail 211 extending longitudinally along the second direction is arranged on the mounting seat 21. The sliding seat 222 is movably connected to the mounting seat 21 along the second direction through sliding cooperation of the sliding block 2221 and the sliding rail 211.

Specifically, in the embodiment, the first adsorption mechanism 22 further includes a roller 225 and a driving board 224. The roller 225 is mounted on the sliding seat 222, and the driving board 224 is mounted on a driving end of the first driving member 223 and has a clamping groove, and the roller 225 is clamped in the clamping groove to make the roller 225 move along the second direction with the driving board 224. In this way, the driving end of the first driving member 223 drives the driving board 224 to move along the second direction. And the driving board 224 drives the sliding seat 222 to move along the second direction through cooperation of the roller 225 and the clamping groove.

Specifically, in an embodiment, the first adsorption mechanism 22 further includes a second driving member 226. The first adsorption seat 221 is movably connected to the sliding seat 222 along the first direction. The second driving member 226 is fixedly arranged relative to the sliding seat 222 and is connected to the first adsorption seat 221 by transmission, so as to drive the first adsorption seat 221 to move along the first direction relative to the sliding seat 222, so that the first adsorption seat 221 approaches or moves away from the second adsorption seat 231. Optionally, the second driving member 226 can be an air cylinder.

Specifically, in the embodiment, the roll replacing apparatus further includes a connecting board 30, and the connecting board 30 is fixedly connected to the sliding seat 222 to move synchronously with the sliding seat 222 along the second direction. The first unwinding mechanism 11 and the second unwinding mechanism 12 are arranged on the connecting board 30 along the second direction. In this way, during the roll replacing process, the first unwinding mechanism 11 and its unwinding output first material strip a, and the second unwinding mechanism 12 and its unwinding output second material strip can move synchronously with the sliding seat 222 along the second direction, so that the starting end of the first material strip a is able to be pasted with the cut-off end of the second material strip or the starting end of the second material strip can be pasted with the cut-off end of the first material strip a during the roll replacing.

Furthermore, the first unwinding mechanism 11 includes a first unwinding tray, and the first unwinding tray is rotatably connected to the connecting board 30 around its own axis. The first unwinding tray is used to load the material rolls of the first material strip a. The second unwinding mechanism 12 includes a second unwinding tray, and the second unwinding tray is rotatably connected to the connecting board 30 around its own axis. The second unwinding tray is used to load the material rolls of the second material strip.

Furthermore, both the first unwinding tray and the second unwinding tray are rotatably connected to the connecting board 30 through a rotating shaft 13. Optionally, the rotating shaft 13 may be a differential air shaft.

Specifically, in the embodiment, the second driving member 226 is fixedly connected to the connecting board 30 or the sliding seat 222 through a fixed seat 2261 to realize a fixed setting of the second driving member 226 relative to the sliding seat 222. Furthermore, the first adsorption mechanism 22 further includes a limiting rod 227, and the fixed seat 2261 is provided with a limiting hole or a limiting groove. The limiting rod 227 is slidably cooperated with the limiting hole or the limiting groove, and one end of the limiting rod 227 is fixedly connected to the first adsorption seat 221. More specifically, one end of the limiting rod 227 facing away from the first adsorption seat 221 is provided with a limiting portion, and the limiting portion can abut against one side of the fixed seat 2261 facing away from the first adsorption seat 221 in a process of the limiting rod 227 sliding along the limiting hole or the limiting groove, so that a moving range of the first adsorption seat 221 along the first direction is limited.

Specifically, in the embodiment, the unwinding assembly 10 further includes a first transporting roller 14 and a second transporting roller 15. The first transporting roller 14 can be rotatably connected to the connecting board 30 around its own axis and is located between the first unwinding mechanism 11 and the roll replacing assembly, so that the first material strip a unwound and output by the first unwinding mechanism 11 is guided between the first adsorption seat 221 and the second adsorption seat 231. The second transporting roller 15 can be rotatably connected to the connecting board 30 around its own axis and is located between the second unwinding mechanism 12 and the roll replacing assembly, so that the second material strip unwound and output by the second unwinding mechanism 12 is guided between the first adsorption seat 221 and the second adsorption seat 231.

It should be noted that the second driving member 226 is not necessary, that is to say, in another embodiment, as shown in FIG. 6 and FIG. 7, the sliding seat 222 can only move along the second direction under a driving force of the first driving member 223, but cannot move along the first direction, that is to say, the first adsorption seat 221 can only move along the second direction with the sliding seat 222, but cannot move along the first direction. At this time, tightly-pressing of the first material strip a or the second material strip can be realized only by a movement of the second adsorption seat 231 along the first direction. As such, the second driving member 226, the fixed seat 2261, the limiting rod 227, etc., can be omitted, which simplifies a structure and reduces device cost.

Please refer to FIG. 1, in the embodiment of the present application, the second adsorption mechanism 23 further includes a lifting seat 232 and a third driving member 233. The lifting seat 232 is movably connected to the mounting seat 21 along the first direction, and the second adsorption seat 231 is connected to the lifting seat 232. The third driving member 233 is mounted on the mounting seat 21 and is connected to the lifting seat 232 by transmission, so as to drive the lifting seat 232 to move along the first direction, so that the second adsorption seat 231 is driven to approach or move away from the first adsorption seat 221 along the first direction. Optionally, the third driving member 232 can be an air cylinder.

Figure 5:
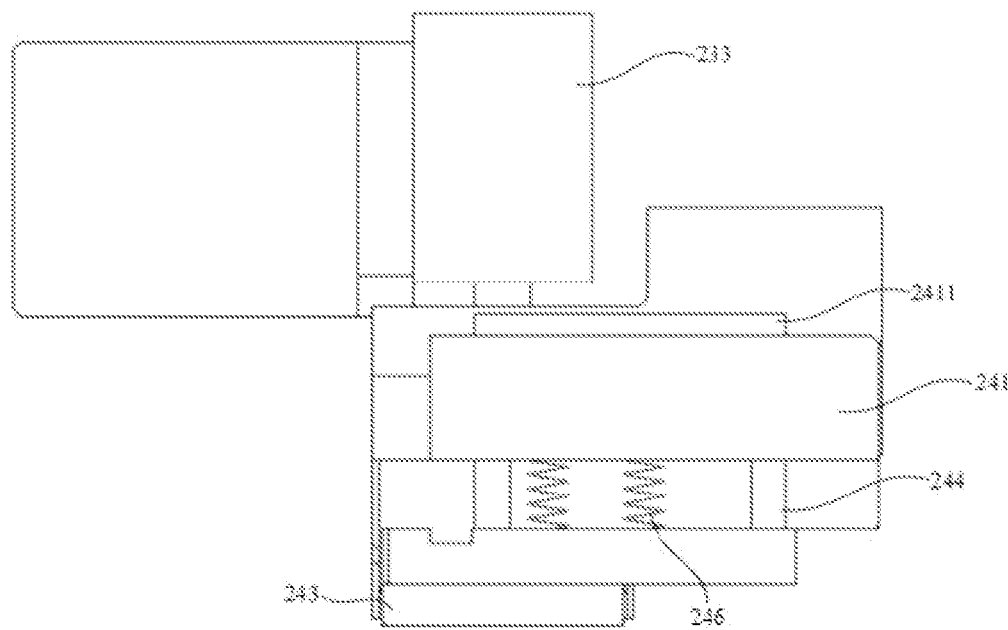
FIG. 5 is a partial schematic diagram of a cutting mechanism of the roll replacing assembly of the roll replacing apparatus shown in FIG. 1.

Please refer to FIG. 1 and FIG. 5 together, in some embodiments, the cutting mechanism 24 includes a guiding seat 241, a cutter 242, and a fourth driving member 245. The cutter 242 is mounted on the guiding seat 241. The fourth driving member 245 is mounted on the lifting seat 232 or the mounting seat 21 and is connected to the guiding seat 241 by transmission, so as to drive the guiding seat 241 to move along the first direction, so that the cutter 242 is driven to move along the first direction. In this way, when the second adsorption seat 231 and the first adsorption seat 221 clamp the first material strip a or the second material strip tightly during the roll replacing, the fourth driving member 245 drives the guiding seat 241 to move along the first direction to drive the cutter 242 to move along the first direction, so that the cutter 242 cuts off a clamped first material strip a or a clamped second material strip in a process of the cutter 242 moving along the first direction. Optionally, the fourth driving member 245 may be an air cylinder.

Furthermore, the first adsorption seat 221 is provided with a cutting groove 2215 corresponding to the cutter 242. When the cutter 242 moves towards the first adsorption seat 221 along the first direction to cut off the first material strip a or the second material strip, the cutter 242 cuts into the cutting groove 2215, so as to prevent the cutter 242 from being damaged due to contact with the first adsorption seat 221. Furthermore, the cutting groove 2215 is provided between the first adsorption area 2211 and the third adsorption area 2213, and the cutting groove 2215 is further provided between the second adsorption area 2212 and the fourth adsorption area 2214.

Specifically, in the embodiment, the cutting mechanism 24 further includes a pressing block 243 and an elastic member 246. The pressing block 243 is movably connected to the guiding seat 241 along the first direction and is located upstream of the cutter 242. That is to say, the cutter 242 is located between the pressing block 243 and the second adsorption seat 231. The elastic member 246 is arranged between the pressing block 243 and the guiding seat 241 to provide a preload force that makes the pressing block 243 have a tendency to approach the first adsorption seat 221 along the first direction. In this way, when the lifting seat 232 drives the second adsorption seat 231 to approach the first adsorption seat 221 to clamp the first material strip a or the second material strip, the fourth driving member 245 drives the guiding seat 241 to drive the cutter 242 and the pressing block 243 to approach the first adsorption seat 221, making the pressing block 243 press the first material strip a or the second material strip tightly on the first adsorption seat 221 (at this time, the elastic member 246 is compressed). And then, the cutter 242 cuts off the first material strip a or the second material strip. Optionally, the elastic member 246 can be a spring.

It should be noted that in a process of the guiding seat 241 driving the cutter 242 and the pressing block 243 to approach the first adsorption seat 221, the guiding seat 241 presses the first material strip a or the second material strip tightly onto the first adsorption seat 221 firstly, and then the cutter 242 contacts the first material strip a or the second material strip to cut off the first material strip a or the second material strip.

Furthermore, the cutting mechanism 24 further includes a guiding rod 244, and the guiding rod 244 is slidably cooperated with the guiding seat 241. The pressing block 243 is fixedly connected to one end of the guiding rod 244 facing the first adsorption seat 221. More specifically, the guiding seat 241 is provided with a guiding hole, and the guiding rod 244 is threaded in the guiding hole and is slidably cooperated with the guiding hole. One end of the guiding rod 244 away from the pressing block 243 is located at one side of the guiding seat 241 facing away from the pressing block 243 and is connected to a limiting block 2411. During a process of the guiding rod 244 sliding along the first direction relative to the guiding seat 241, the limiting block can abut against the side of the guiding seat 241 facing away from the pressing block 243 to limit a moving range of the guiding rod 244 along the first direction. Optionally, there are two or more of the guiding rods 244.

Specifically, in the embodiment, the roll replacing apparatus further includes a detector 40 arranged on the second adsorption mechanism 23, and the detector 40 is used to detect an unwinding situation of the material rolls on the first unwinding mechanism 11 when the first adsorption seat 221 is located at the first position, or an unwinding situation of the material rolls on the second unwinding mechanism 12 when the first adsorption seat 221 is located at the second position, so that when the detector 40 detects that the unwinding of the material rolls on the first unwinding mechanism 11 or the second unwinding mechanism 12 is completed, the first adsorption mechanism 22, the second adsorption mechanism 23, and the cutting mechanism 24 perform a roll replacing action. Optionally, the detector 40 is mounted on the guiding seat 241, and the detector 40 may be a photoelectric sensor.

Please refer to FIG. 1 and FIG. 2, following is a description of a roll replacing process of the roll replacing apparatus with the first adsorption seat 221 being located at the first position, the starting end of the second material strip unwound and output by the second unwinding mechanism 12 being pressed onto the second adsorption area 2212 tightly by the first material-pressing end 241' of the first strip-pressing mechanism 24', and the first material strip a unwound and output by the first unwinding mechanism 11 passing between the first adsorption seat 221 and the second adsorption seat 231 and being transported downstream as an initial state:

When the unwinding of the material rolls on the first unwinding mechanism 11 is completed and a roll replacing is required, firstly, the first adsorption seat 221 and the second adsorption seat 231 approach each other under a driving force of the second driving member 226 and the third driving member 233, respectively (or, in an embodiment in which the first adsorption seat 221 cannot move along the first direction, the second adsorption seat 231 is driven to approach the first adsorption seat 221 under a driving force of the third driving member 233), so as to clamp the first material strip a tightly.

Then, the fourth driving member 245 drives the guiding seat 241 to approach the first adsorption seat 221, making the pressing block 243 press the first material strip a tightly; as the guiding seat 241 continues to approach the first adsorption seat 221, the cutter 242 cuts off the first material strip a. After the first material strip a is cut off, the fourth driving member 245 drives the guiding seat 241 to reset.

And then, at this time, the cut-off end of the first material strip a is adsorbed by the second adsorption seat 231, one end of the first material strip a connecting to the material roll is adsorbed by the third adsorption area 2213, and the starting end of the second material strip unwound and output by the second unwinding mechanism 12 is adsorbed by the second adsorption area 2212. The second driving member 226 drives the first adsorption seat 221 to move away from the second adsorption seat 231 along the first direction (or, in an embodiment in which the first adsorption seat 221 cannot move along the first direction, and the second adsorption seat 231 is driven to move away from the first adsorption seat 221 under the driving force of the third driving member 233), so that the first driving member 223 drives the first adsorption seat 221 to move to the second position along the second direction.

And then, the second driving member 226 drives the first adsorption seat 221 to approach the second adsorption seat 231 along the first direction (or, in the embodiment in which the first adsorption seat 221 cannot move along the first direction, and the second adsorption seat 231 is driven to approach the first adsorption seat 221 under the driving force of the third driving member 223), so that the cut-off end of the first material strip a adsorbed by the second adsorption seat 231 is pasted onto the starting end of the second material strip adsorbed by the second adsorption area 2212, so as to realize connecting of the second material strip with the cut-off end of the first material strip a.

Finally, the second adsorption seat 231 releases the adsorption of the cut-off end of the first material strip a, and the second adsorption area 2212 of the first adsorption seat 221 releases the adsorption of the starting end of the second material strip. And the second driving member 226 and the third driving member 233 drive the first adsorption seat 221 and the second adsorption seat 231 to move away from each other, respectively (or, in the embodiment in which the first adsorption seat 221 cannot move along the first direction, and the second adsorption seat 231 is driven to move away from the first adsorption seat 221 under the drive of the third driving member 233), so that the second material strip can pass between the first adsorption seat 221 and the second adsorption seat 231 to be transported downstream.

The material rolls on the first roll replacing mechanism 11 are replaced, and the starting end of the first material strip a unwound and output by the first roll replacing mechanism 11 is pressed onto the first adsorption area 2211 tightly by the second material-pressing end 251 of the second strip-pressing mechanism 25, so as to prepare for the roll replacing for a next time. When the unwinding of the material rolls on the second unwinding mechanism 12 is completed, roll replacing steps are similar to the above-mentioned roll replacing steps, so it will not be repeated here.

Based on the above-mentioned roll replacing apparatus, a winding device is provided in the present application, which includes the roll replacing apparatus as described in any one of the above-mentioned embodiments. Specifically, the winding device further includes a film-making device and a winding device. The roll replacing mechanism is used to transport the first material strip or the second material strip to the film-making device located downstream, and the film-making device is used to paste the first material strip or the second material strip to one side of a winding material strip. The winding device is arranged downstream of the film-making device, which is used to wind the winding material strip after the first material strip or the second material strip is pasted.

Figure 9:
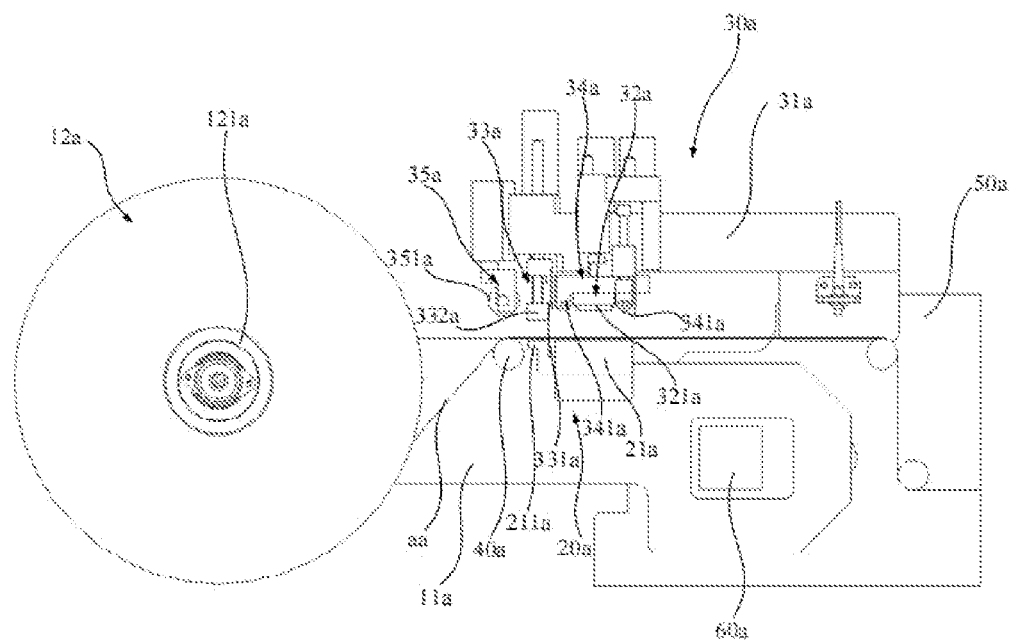
FIG. 9 is a front view of the roll replacing apparatus in an embodiment of the present application.
Figure 10:
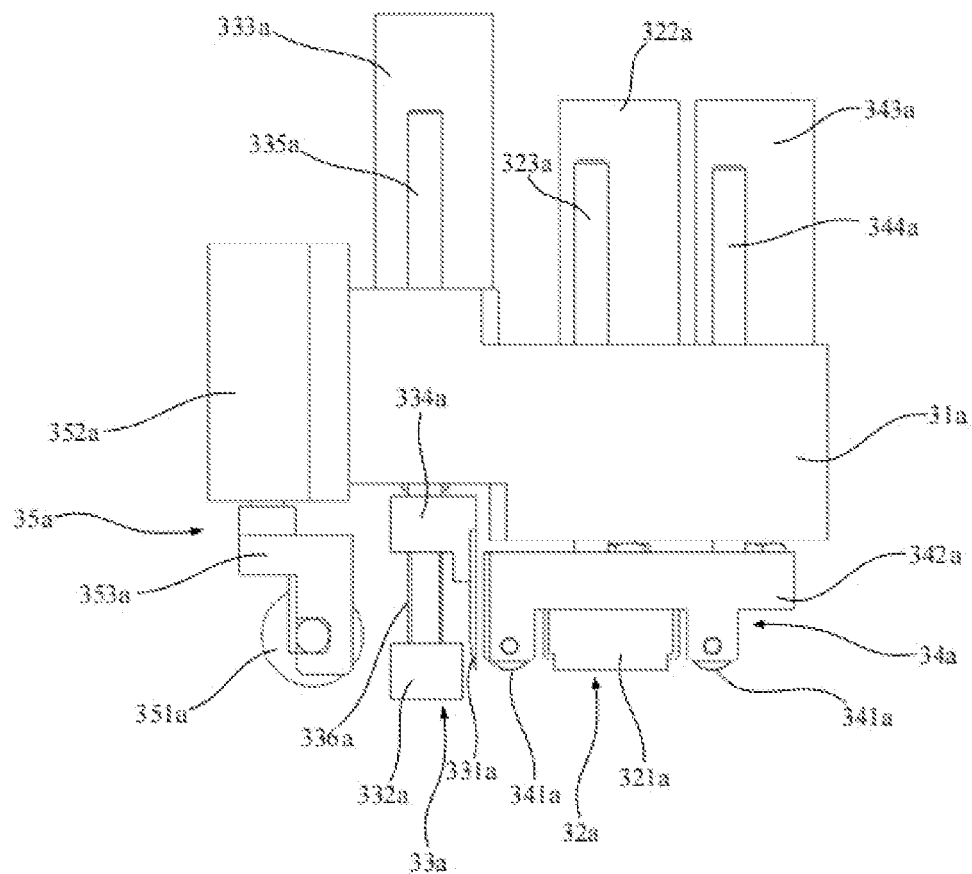
FIG. 10 is a front view of a roll replacing mechanism of the roll replacing apparatus shown in FIG. 9 (some elements are omitted).
Figure 11:
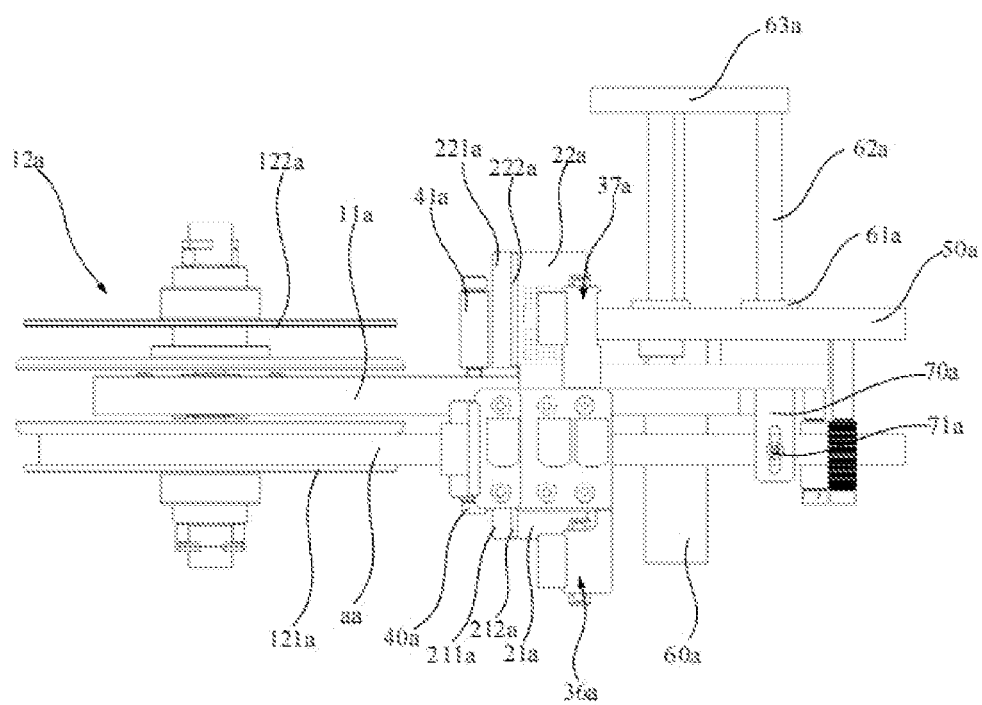
FIG. 11 is a top view of the roll replacing apparatus shown in FIG. 9.

Please refer to FIG. 9, FIG. 10, and FIG. 11, a roll replacing apparatus is provided in an embodiment of the present application, which includes an unwinding mechanism, an adsorption mechanism 20a, and a roll replacing mechanism 30a. The unwinding mechanism includes a moving seat 11a and an unwinding assembly 12a mounted on the moving seat 11a. The unwinding assembly 12a is used to output a first material strip aa and a second material strip downstream. Specifically, the unwinding assembly 12a includes a first unwinding assembly 121a used to output the first material strip aa downstream and a second unwinding assembly 122a used to output the second material strip downstream (see FIG. 11). And the first unwinding assembly 121a and the second unwinding assembly 122a are arranged at an interval along a first direction.

The first material strip aa unwound and output by the first unwinding assembly 121a or the second material strip unwound and output by the second unwinding assembly 122a can pass between the adsorption mechanism 20a and the roll replacing mechanism 30a to be transported downstream. The roll replacing mechanism 30a is used to realize switching between the first material strip aa and the second material strip with cooperation of the adsorption mechanism 20a, that is to say, when unwinding of the first material strip aa on the first unwinding assembly 121a is completed, the second material strip unwound and output by the second unwinding assembly 122a is switched to be transported downstream; when unwinding of the second material strip of the second unwinding assembly 122a is completed, the first material strip aa unwound and output by the first unwinding assembly 121a is switched to be transported downstream.

The adsorption mechanism 20a includes a first adsorption seat 21a and a second adsorption seat 22a. Both the first adsorption seat 21a and the second adsorption seat 22a are fixed relative to the moving seat 11a and are arranged along the first direction. The first adsorption seat 21a and the second adsorption seat 22a are located downstream of the unwinding assembly 12a and are used to adsorb the first material strip aa and the second material strip, respectively. Specifically, the first adsorption seat 21a is located downstream of the first unwinding assembly 121a and is used to adsorb the first material strip aa output by the first unwinding assembly 121a. And the second adsorption seat 22a is located downstream of the second unwinding assembly 122a and is used to adsorb the second material strip output by the second unwinding assembly 122a.

The roll replacing mechanism 30a includes a mounting seat 31a, a tape adsorption assembly 32a, and a cut-off assembly 33a. The tape adsorption assembly 32a and the cut-off assembly 33a are arranged on the mounting seat 31a, and the tape adsorption assembly 32a has a tape adsorption end located downstream of the cut-off assembly 33a. The tape adsorption end controllably moves along a second direction, that is to say, the first material strip aa or the second material strip firstly passes through the cut-off assembly 33a, and then passes through the tape adsorption end of the tape adsorption assembly 32a. Wherein, the second direction intersects with the first direction. Optionally, the second direction is perpendicular to the first direction. Specifically, in the embodiment as shown in FIG. 9, the first direction is perpendicular to the page, and the second direction is an up-down direction. The first material strip aa and the second material strip are transported and pass between the first adsorption seat 21a and the second adsorption seat 22a along a left-right direction, respectively. It should be noted that in this text, both upstream and downstream in this context are relative to a transporting direction of the first material strip aa or the second material strip, that is to say, the first material strip aa or the second material strip passes through the upstream firstly, and then passes through the downstream.

The moving seat 11a is configured to controllably move along the first direction relative to the mounting seat 31a, and the moving seat 11a can be alternately switched between a first position (see FIG. 11) and a second position in a process of the moving seat 11a moving along the first direction relative to the mounting seat 31a. When the moving seat 11a moves to the first position, the tape adsorption end of the tape adsorption assembly 32a and the cut-off assembly 33a are opposite to the first adsorption seat 21a in the second direction, so as to adsorb and cut off the first material strip aa on the first adsorption seat 21a, respectively. When the moving seat 11a moves to the second position, the tape adsorption end of the tape adsorption assembly 32a and the cut-off assembly 33a are opposite to the second adsorption seat 22a in the second direction, so as to adsorb and cut off the second material strip on the second adsorption seat 22a, respectively.

The above-mentioned roll replacing apparatus is illustrated by taking the first material strip aa as a working material strip and a second material strip as a standby material strip. At this time, the moving seat 11a is located at the first position, the cut-off assembly 33a and the tape adsorption assembly 32a are opposite to the first adsorption seat 21a in the second direction; and the first material strip aa unwound and output by the first unwinding assembly 121a passes between the cut-off assembly 33a, the tape adsorption end of the tape adsorption assembly 32a, and the first adsorption seat 21a to be transported downstream. A starting end of the second material strip unwound and output by the second unwinding assembly 122a is adsorbed and fixed in the second adsorption seat 22a. When material rolls on the first unwinding assembly 121a are used up and need to be replaced, firstly, the tape adsorption end of the tape adsorption assembly 32a moves to the first adsorption seat 21a along the second direction until the first material strip aa is pressed tightly; and the cut-off assembly 33a cuts off the first material strip aa, and after cutting off the first material strip aa, the tape adsorption end of the tape adsorption assembly 32a moves away from the first adsorption seat 21a along the second direction to reset. At this time, the cut-off end of the cut-off first material strip aa is adsorbed on the tape adsorption end. Then, the moving seat 11a moves to the second position along the first direction relative to the mounting seat 31a. At this time, the tape adsorption end of the tape adsorption assembly 32a and the cut-off assembly 33a are opposite to the second adsorption seat 22a in the second direction. At this time, the tape adsorption end of the tape adsorption assembly 32a moves towards the second adsorption seat 22a along the second direction until the cut-off end of the first material strip aa and the starting end of the second material strip are pressed onto the second adsorption seat 22a tightly together, making the cut-off end of the first material strip aa and the starting end of the second material strip be pasted to each other. Finally, the tape adsorption end of the tape adsorption assembly 32a releases the adsorption of the first material strip aa and moves away from the second adsorption seat 22a along the second direction to reset; and the second adsorption seat 22a also releases the adsorption of the second material strip, making the second material strip follow the cut-off first material strip aa to pass between the tape adsorption end, the cut-off assembly 33a, and the second adsorption seat 22a to be transported downstream, that is to say, roll replacing is realized.

In this way, the roll replacing apparatus in the present application can realize automatic switching between the first material strip aa and the second material strip. Compared with a manual roll replacing method adopted in the prior art, the present application greatly shortens downtime and improves production efficiency, and there is no need for personnel to be on duty, which reduces staffing and then lowers labor cost.

It should be noted that the first material strip aa and the second material strip can be tapes. Therefore, during a process of roll replacing, the starting end of the first material strip aa can be pasted to the cut-off end of the second material strip or the starting end of the second material strip is pasted to the cut-off end of the first material strip aa. Of course, in other embodiments, the first material strip aa and the second material strip may not be tapes. At this time, the starting end of the first material strip aa on the material rolls is pasted with double-sided tapes to facilitate pasting of the starting end of the first material strip aa and the cut-off end of the second material strip during the process of roll replacing. The starting end of the second material strip on the material rolls is pasted with double-sided tapes to facilitate pasting the starting end of the second material and the cut-off end of the first material strip aa during the process of roll replacing.

In the embodiment of the present application, the roll replacing apparatus further includes a base 50a and a roll-replacing driving member 60a. The mounting seat 31a is fixedly connected to the base 50a, and the moving seat 11a is movably connected to the base 50a along the first direction, making the moving seat 11a able to move along the first direction relative to the base 50a and the mounting seat 31a. The roll-replacing driving member 60a is arranged on the base 50a and is drivingly connected to the moving seat 11a, making the roll-replacing driving member 60a drive the moving seat 11a to reciprocate between the first position and the second position along the first direction, so as to complete an automatic roll replacing action. Optionally, the roll-replacing driving member 60a can be an air cylinder.

Specifically, in the embodiment, both the above-mentioned first adsorption seat 21a and the second adsorption seat 22a can be directly or indirectly fixedly connected to the moving seat 11a, making the first adsorption seat 21a and the second adsorption seat 22a move along the first direction together with the moving seat 11a.

Specifically, in the embodiment, the roll replacing apparatus further includes a first guiding sleeve 61a and a first guiding rod 62a. The first guiding sleeve 61a is mounted on the base 50a, and the first guiding rod 62a is slidably cooperated with the first guiding sleeve 61a, and a longitudinal direction of the first guiding rod 62a is parallel to the first direction. One end of the first guiding rod 62a is fixedly connected to the moving seat 11a, and another end of the first guiding rod 62a is connected to a driving end of the roll-replacing driving member 60a, so that the roll-replacing driving member 60a drives the moving seat 11a to move along the first direction through the first guiding rod 62a. In this way, sliding cooperation of the first guiding rod 62a and the first guiding sleeve 61a is used to guide the moving seat 11a to move along the first direction, so that a movement of the moving seat 11a between the first position and the second position is more stable and reliable.

Furthermore, the base 50a is provided with a plurality of the first guiding sleeve 61a, and one first guiding rod 62a is slidably cooperated with each first guiding sleeve 61a. One end of each first guiding rod 62a is fixedly connected to the moving seat 11a, and one end of each first guiding rod 62a facing away from the moving seat 11a is fixedly connected to a driving board 63a. The driving end of the roll-replacing driving member 60a is fixedly connected to the driving board 63a, so that each first guiding rod 62a is driven by the driving board 63a to slide relative to the first guiding sleeve 61a, thereby driving the moving seat 11a to move along the first direction.

It should be noted that it is not limited to guiding the moving seat 11a to move along the first direction relative to the base 50a by adopting cooperation of the guiding rod and the guiding sleeve. In other embodiments, the moving seat 11a can also be guided to move along the first direction by adopting sliding cooperation of a sliding rail and a sliding block, which is not limited here.

Specifically, in the embodiment, the roll replacing apparatus further includes a mounting bracket 70a and a photoelectric sensor 71a. The mounting bracket 70a is fixedly connected to the base 50a, and the photoelectric sensor 71a is mounted on the mounting bracket 70a. The photoelectric sensor 71a is located downstream of the roll replacing mechanism 30a and is used to detect an end mark on the first material strip aa or the second material strip transported downstream through the roll replacing mechanism 30a. When the photoelectric sensor 71a detects the end mark, it can be determined that a current working material roll is used up and needs to be replaced automatically.

In an embodiment of the present application, the tape adsorption assembly 32a includes a tape adsorption driving member 322a and a tape adsorption block 321a. The tape adsorption driving member 322a is arranged on the mounting seat 31a and is drivingly connected to the tape adsorption block 321a. The tape adsorption block 321a serves as the above-mentioned tape adsorption end. The tape adsorption driving member 322a is used to drive the tape adsorption block 321a to approach or move away from the first adsorption seat 21a or the second adsorption seat 22a along the second direction. In this way, when the first material strip aa on the first adsorption seat 21a needs to be pressed tightly and adsorbed, the moving seat 11a moves to the first position along the first direction, and the tape adsorption driving member 322a drives the tape adsorption block 321a to move towards the first adsorption seat 21a along the second direction until the first material strip aa is pressed tightly on the first adsorption seat 21a. When the second material strip of the second adsorption seat 22a needs to be pressed tightly and adsorbed, the moving seat 11a moves to the second position along the first direction, and the tape adsorption driving member 322a drives the tape adsorption block 321a to move towards the second adsorption seat 22a along the second direction until the second material strip is pressed tightly on the second adsorption seat 22a. Optionally, the tape adsorption driving member 322a can be an air cylinder.

It should be noted that in one embodiment, a movement of the tape adsorption block 321a relative to the mounting seat 31a along the second direction is guided by a guiding post 323a, so that the movement of the tape adsorption block 321a along the second direction is more stable and reliable. Of course, in other embodiments, the movement of the tape adsorption block 321a relative to the mounting seat 31a along the second direction can be guided by other guiding structures, such as a guiding structure including a sliding rail and a sliding block, which is not limited here.

Specifically, in the embodiment, the roll replacing mechanism 30a further includes an anti-pasting assembly 34a, and the anti-pasting assembly 34a includes a roller seat 342a and an anti-pasting roller 341a. The roller seat 342a is movably connected to the mounting seat 31a along the second direction. The anti-pasting roller 341a is rotatably connected to the roller seat 342a and is located upstream and/or downstream of the tape adsorption block 321a. The roller seat 342a can move to a pressing position along the second direction. When the roller seat 342a moves to the pressing position, the anti-pasting roller 341a tightly presses the first material strip aa on the first adsorption seat 21a or the second material strip on the second adsorption seat 22a.

In this way, during a roll replacing process, after the tape adsorption block 321a presses the cut-off end of the first material strip aa and the starting end of the second material strip onto the second adsorption seat 22a tightly, making the cut-off end of the first material strip aa and the starting end of the second material strip be pasted to each other, the roller seat 342a moves towards the second adsorption seat 22a along the second direction until the anti-pasting roller 341a presses the cut-off end of the first material strip aa onto the second adsorption seat 22a (at this time, the roller seat 342a is located at the pressing position); and then the tape adsorption block 321a moves away from the second adsorption seat 22a along the second direction to reset. During a process of the tape adsorption block 321a resetting, because the first material strip aa and the second material strip pasted to each other are pressed onto the second adsorption seat 22a tightly by the anti-pasting roller 341a, it can ensure that the tape adsorption block 321a is separated from the first material strip aa, so as to prevent the first material strip aa from being pasted onto the tape adsorption block 321a and being taken away by the tape adsorption block 321a. After the tape adsorption block 321a resets along the second direction, the second material strip follows the first material strip aa to be transported downstream, making the anti-pasting roller 341a roll the pasting position of the first material strip aa and the second material strip to ensure that pasting between the first material strip aa and the second material strip is more reliable. After rolling for a period of time, the roller seat 342a moves away from the second adsorption seat 22a along the second direction to reset, making the anti-pasting roller 341a be separated from the second material strip.

In this way, during a roll replacing process, after the tape adsorption block 321a presses the cut-off end of the second material strip and the starting end of the first material strip aa onto the first adsorption seat 21a tightly, making the cut-off end of the second material strip and the starting end of the first material strip aa be pasted to each other, the roller seat 342a moves towards the first adsorption seat 21a along the second direction until the anti-pasting roller 341a presses the cut-off end of the second material strip onto the first adsorption seat 21a tightly (at this time, the roller seat 342a is located at the pressing position). and then the tape adsorption block 321a moves away from the first adsorption seat 21a along the second direction to reset. During a resetting process of the tape adsorption block 321a, because the first material strip aa and the second material strip pasted to each other are pressed onto the first adsorption seat 21a by the anti-pasting roller 341a, it can ensure that the tape adsorption block 321a is separated from the second material strip, so as to prevent the second material strip from being pasted onto the tape adsorption block 321a and being taken away by the tape adsorption block 321a. After the tape adsorption block 321a resets along the second direction, the first material strip aa follows the second material strip to be transported downstream, making the anti-pasting roller 341a roll the pasting position of the first material strip aa and the second material strip to ensure that pasting between the first material strip aa and the second material strip is more reliable. After rolling for a period of time, the roller seat 342a moves away from the first adsorption seat 21a along the second direction to reset, making the anti-pasting roller 341a be separated from the first material strip aa.

It should be noted that the anti-pasting roller 341a is located upstream and/or downstream of the tape adsorption block 321a, which means that, in one embodiment, the anti-pasting roller 341a is only arranged upstream of the tape adsorption block 321a; in another embodiment, the anti-pasting roller 341a is only arranged downstream of the tape adsorption block 321a; in yet another embodiment, the anti-pasting rollers 341a are arranged upstream and downstream of the tape adsorption block 321a, respectively.

Specifically, in the embodiment, the anti-pasting assembly 34a further includes an anti-pasting driving member 343a arranged on the mounting seat 31a. The anti-pasting driving member 343a is drivingly connected to the roller seat 342a, so as to drive the roller seat 342a to move along the second direction, thereby driving the anti-pasting roller 341a on the roller seat 342a to move along the second direction to complete an anti-pasting action. Optionally, the anti-pasting driving member 343a can be an air cylinder.

Furthermore, the anti-pasting assembly 34a further includes a second guiding sleeve and a second guiding rod 344a. The second guiding sleeve is mounted on the mounting seat 31a. The second guiding rod 344a is slidably cooperated with the second guiding sleeve. The longitudinal direction of the second guiding rod 344a is parallel to the second direction. The roller seat 342a is fixedly connected to one end of the second guiding rod 344a, so that the movement of the roller seat 342a along the second direction is guided by sliding cooperation of the second guiding rod 344a and the second guiding sleeve, making an anti-pasting action stable and reliable. Of course, in other embodiments, other guiding structures (such as a guiding structure including a sliding rail and a sliding block) can be adopted to guide the movement of the roller seat 342a, which is not limited here.

Furthermore, the roller seat 342a has an escape hole for the tape adsorption block 321a to be threaded. A part of the roller seat 342a located upstream of the tape adsorption block 321a is used to install a anti-pasting roller 341a; a part of the roller seat 342a located downstream of the tape adsorption block 321a is also used to install a anti-pasting roller 341a. The tape adsorption block 321a can pass through the escape hole in a process of the tape adsorption block 321a moving along the second direction relative to the roller seat 342a. In this way, on one hand, it is ensured that the anti-pasting rollers 341a are arranged at the upstream and downstream of the tape adsorption block 321a to improve an anti-pasting effect; on another hand, this can prevent the roller seat 342a from interfering with the movement of the tape adsorption block 321a.

In the embodiment of the present application, the cut-off assembly 33a includes a tape-cutting driving member 333a, a cutting-knife seat 334a, and a first cutting knife 331a. The tape-cutting driving member 333a is arranged on the mounting seat 31a and is drivingly connected to the cutting-knife seat 334a, so as to drive the cutting-knife seat 334a to move along the second direction. The first cutting knife 331a is mounted on the cutting-knife seat 334a and is located upstream of the tape adsorption end (that is, the tape adsorption block 321a). During a process of the cutting-knife seat 334a moving along the second direction, the first cutting knife 331a can be driven to move along the second direction, so as to cut off the first material strip aa on the first adsorption seat 21a or the second material strip on the second adsorption seat 22a. Optionally, the tape-cutting driving member 333a can be an air cylinder.

Furthermore, the cut-off assembly 33a further includes a third guiding sleeve and a third guiding rod 335a. The third guiding sleeve is mounted on the mounting seat 31a. The third guiding rod 335a is slidably cooperated with the third guiding sleeve, and the longitudinal direction of the third guiding rod 335a is parallel to the second direction. The cutting-knife seat 334a is fixedly connected to one end of the third guiding rod 335a, so that a movement of the cutting-knife seat 334a along the second direction can be guided by sliding cooperation of the third guiding rod 335a and the third guiding sleeve, so that a tape-cutting action of the first cutting knife 331a is stable and reliable.

Specifically, in the embodiment, an upstream side of the first adsorption seat 21a is connected with a first supporting seat 211a, and an upstream side of the second adsorption seat 22a is connected with a second supporting seat 221a. The cut-off assembly 33a further includes a tape-pressing block 332a and a first elastic member 336a. The tape-pressing block 332a is movably connected to the cutting-knife seat 334a along the second direction, and the first elastic member 336a abuts against between the tape-pressing block 332a and the cutting-knife seat 334a, so as to provide a preload force that makes the tape-pressing block 332a have a tendency to move towards the first adsorption seat 21a or the second adsorption seat 22a along the second direction.

When the moving seat 11a is located at the first position, the tape-pressing block 332a is opposite to the first supporting seat 211a in the second direction. During a process of driving the cutting-knife seat 334a to move towards the first adsorption seat 21a along the second direction, the tape-cutting driving member 333a drives the tape-pressing block 332a to move towards the first supporting seat 211a, so that the tape-pressing block 332a presses the first material strip aa onto the first supporting seat 211a tightly, so as to avoid a poor cut-off effect caused by the shaking of the first material strip when the first cutting knife 331a cuts the first material strip. When the moving seat 11a is located at the second position, the tape-pressing block 332a is opposite to the second supporting seat 221a in the second direction. During a process of driving the cutting-knife seat 334a to move towards the second adsorption seat 22a along the second direction, the tape-cutting driving member 333a drives the tape-pressing block 332a to move towards the second supporting seat 221a, so that the tape-pressing block 332a presses the second material strip onto the second supporting seat 221a tightly, so as to avoid a poor cut-off effect caused by the shaking of the second material strip when the first cutting knife 331a cuts the second material strip.

It should be noted that during a tape-cutting process, in a process of the tape-cutting driving member 333a driving the cutting-knife seat 334a to move towards the first adsorption seat 21a or the second adsorption seat 22a along the second direction, the tape-pressing block 332a comes into contact with the first material strip aa or the second material strip before the first cutting knife 331a. As the cutting-knife seat 334a continues to move towards the first adsorption seat 21a or the second adsorption seat 22a, the first cutting knife 331a contacts the first material strip aa or the second material strip and cuts it off.

Furthermore, a first cutting groove 212a for the first cutting knife 331a to cut into is provided between the first supporting seat 211a and the first adsorption seat 21a, so as to prevent the first cutting knife 331a from being damaged by contacting the first adsorption seat 21a when cutting the first material strip aa. A second cutting groove 222a for the first cutting knife 331a to cut into is defined between the second supporting seat 221a and the second adsorption seat 22a, so as to prevent the first cutting knife 331a from being damaged by contacting the second adsorption seat 22a when cutting the second material strip.

In the embodiment of the present application, the roll replacing mechanism 30a further includes a tape-pressing assembly 35a, and the tape-pressing assembly 35a includes a tape-pressing driving member 352a, a tape-pressing seat 353a, and a tape-pressing roller 351a. The tape-pressing driving member 352a is arranged on the mounting seat 31a and is drivingly connected to the tape-pressing seat 353a, so as to drive the tape-pressing seat 353a to move along the second direction. The tape-pressing roller 351a is rotatably connected to the tape-pressing seat 353a and is located upstream of the cut-off assembly 33a. Optionally, the tape-pressing driving member 352a can be an air cylinder.

The roll replacing apparatus further includes a first transporting roller 40a and a second transporting roller 41a, both arranged on the moving seat 11a. The first transporting roller 40a and the second transporting roller 41a are used for winding the first material strip aa and the second material strip. When the moving seat 11a is located at the first position, the tape-pressing roller 351a is opposite to the first transporting roller 40a in the second direction. The tape-pressing driving member 352a can drive the tape-pressing roller 351a to move towards the first transporting roller 40a along the second direction through the tape-pressing seat 353a until the tape-pressing roller 351a presses the first material strip aa onto the first transporting roller 40a tightly, which prevents random swinging of the first material strip aa located between the first unwinding assembly 121a and the cut-off assembly 33a (i.e., a tail of the first material strip aa) after the first material strip aa is cut off. Because the tape-pressing roller 351a can be rotatable around its own axis, the first material strip aa can still be transported downstream when the tape-pressing roller 351a and the first transporting roller 40a press the first material strip aa tightly.

When the moving seat 11a is located at the second position, the tape-pressing roller 351a is opposite to the second transporting roller 41a in the second direction. The tape-pressing driving member 352a can drive the tape-pressing roller 351a to move towards the second transporting roller 41a along the second direction through the tape-pressing seat 353a until the tape-pressing roller 351a presses the second material strip onto the second transporting roller 41a, which prevents random swinging of the second material strip located between the second unwinding assembly 122a and the cut-off assembly 33a (i.e., a tail of the second material strip) after the second material strip is cut off. Because the tape-pressing roller 351a is rotatable around its own axis, the second material strip can still be transported downstream when the tape-pressing roller 351a and the second transporting roller 41a press the second material strip tightly.

It should be noted that in actual production, there is a situation that some material rolls are not provided with end marks at an end of a material strip. Therefore, it is impossible to use the photoelectric sensor 71a to determine a time point at which the roll replacing is required. In order to solve the problem that it is impossible to accurately determine the time point for roll replacing. in actual production, a detection mechanism (such as a material strip buffer mechanism) for detecting a tension change of a working material strip can be set on a strip path of the working strip (the first material strip aa or the second material strip). When a tail end of the working material strip is separated from a feeding cylinder, the working material strip loses tension or the tension is small enough. At this time, the detection mechanism can detect the tension change of the working material strip, so as to determine that the roll replacing is required at this time. Furthermore, since the tail end of the working material strip is separated from the feeding cylinder. The tape-pressing assembly 35a enables the tail end of the working material strip to be pressed onto the first transporting roller 40a or the second transporting roller 41a through the tape-pressing roller 351a, so as to prevent the tail end of the working material strip from swinging randomly.

Figure 12:
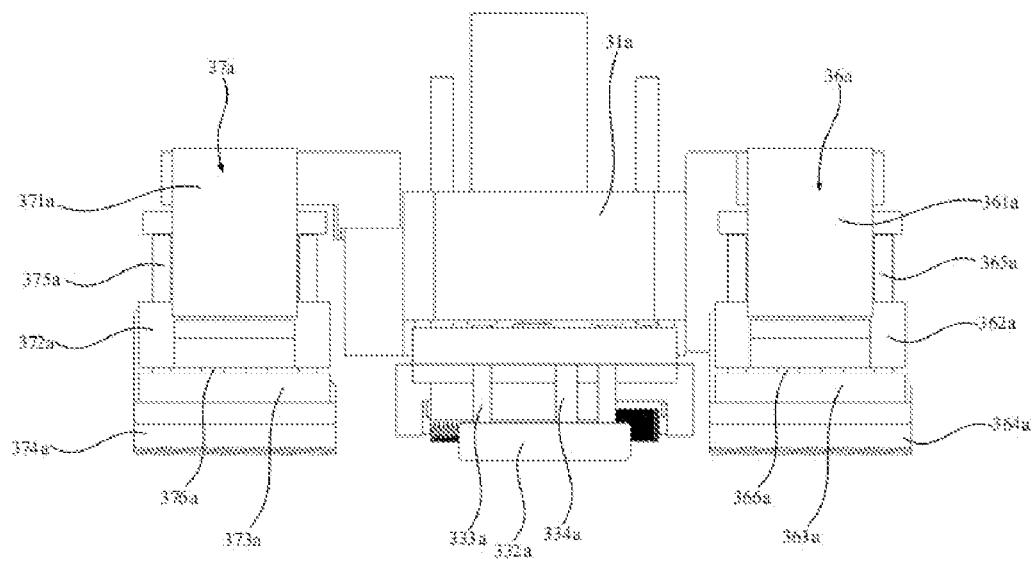
FIG. 12 is a left side view of the roll replacing apparatus shown in FIG. 9 (some elements are omitted).

Please refer to FIG. 12, in the embodiment of the present application, the roll replacing mechanism 30a further includes a first pressing assembly 36a and a second pressing assembly 37a, both arranged on the mounting seat 31a. The first pressing assembly 36a and the second pressing assembly 37a are located at two ends of the tape adsorption end (the tape adsorption block 321a) along the first direction, respectively. The first pressing assembly 36a has a first pressing end movable along the second direction. And the second pressing assembly 37a has a second pressing end movable along the second direction.

When the moving seat 11a is located at the first position, the second pressing end is opposite to the second adsorption seat 22a in the second direction, so that the second pressing end can move towards the second adsorption seat 22a along the second direction to make the starting end of the second material strip be pressed onto the second adsorption seat 22a tightly. At this time, the second adsorption seat 22a can discontinue the adsorption of the second material strip, so as to avoid that the second adsorption seat 22a needs to maintain a negative pressure state all the time to adsorb the second material strip, which is conducive to reducing energy consumption and reducing production cost. When the moving seat 11a is located at the second position, the first pressing end is opposite to the first adsorption seat 21a in the second direction, so that the first pressing end can move along the second direction to make the starting end of the first material strip aa be pressed onto the first adsorption seat 21a tightly. At this time, the first adsorption seat 21a can discontinue the adsorption of the first material strip aa, so as to avoid that the first adsorption seat 21a needs to maintain the negative pressure state all the time to adsorb the first material strip aa, which is conducive to reducing energy consumption and reducing the production cost.

Specifically, in the embodiment, the first pressing assembly 36a further has a first cutting end movable along the second direction, and the second pressing assembly 37a further has a second cutting end movable along the second direction.

When the moving seat 11a is located at the first position, the second cutting end is opposite to the second adsorption seat 22a in the second direction. The second cutting end can cut off the second material strip in a process of the second cutting end moving towards the second adsorption seat 22a along the second direction, so that the starting end of the second material strip is cut to be smooth to facilitate subsequent pasting with the cut-off end of the first material strip aa. Furthermore, the second cutting end is aligned with a downstream edge of the second adsorption seat 22a, so that the second cutting end does not contact the second adsorption seat 22a to avoid damage when cutting off the second material strip.

When the moving seat 11a is located at the second position, the first cutting end is opposite to the first adsorption seat 21a in the second direction. the first cutting end can cut off the first material strip aa in a process of moving towards the first adsorption seat 21a along the second direction, so that the starting end of the first material strip aa is cut to be smooth to facilitate subsequent pasting with the cut-off end of the second material strip. Furthermore, the first cutting end is aligned with a downstream edge of the first adsorption seat 21a, so that the first cutting end does not contact the first adsorption seat 21a to avoid damage when cutting off the first material strip aa.

Specifically, in the embodiment, the first pressing assembly 36a includes a first pressing driving member 361a, a first movable seat 362a, a second cutting knife 364a, a first pressing block 363a, and a second elastic member 366a. The first pressing driving member 361a is arranged on the mounting seat 31a and is drivingly connected to the first movable seat 362a, so as to drive the first movable seat 362a to move along the second direction. And the second cutting knife 364a serves as the above-mentioned first cutting end and is mounted on the first movable seat 362a, so as to move along the second direction with the first movable seat 362a.

The first pressing block 363a serves as the above-mentioned first pressing end and is movably connected to the first movable seat 362a along the second direction. The second elastic member 366a abuts between the first pressing block 363a and the first movable seat 362a, so as to provide a preload force that makes the first pressing block 363a have a tendency to move towards the first adsorption seat 21a. Optionally, the first pressing driving member 361a can be an air cylinder, and the second elastic member 366a can adopt a spring.

In this way, when the moving seat 11a is located at the second position and the starting end of the first material strip aa needs to be pressed tightly and cut off, the first pressing driving member 361a drives the first movable seat 362a to move towards the first adsorption seat 21a along the second direction. Firstly, the first pressing block 363a contacts the first material strip aa and presses the first material strip aa onto the first adsorption seat 21a; as the first movable seat 362a continues to move towards the first adsorption seat 21a, the second cutting knife 364a contacts the first material strip aa and cuts it off.

Furthermore, the first pressing assembly 36a further includes a fourth guiding sleeve and a fourth guiding rod 365a. The fourth guiding sleeve is mounted on the first movable seat 362a, and the fourth guiding rod 365a is slidably cooperated with the fourth guiding sleeve, and one end of the fourth guiding rod 365a is fixedly connected to the first pressing block 363a. A longitudinal direction of the fourth guiding rod 365a is parallel to the second direction. In this way, a movement of the first pressing block 363a along the second direction is guided by sliding cooperation of the fourth guiding rod 365a and the fourth guiding sleeve.

Specifically, in the embodiment, the second pressing assembly 37a includes a second pressing driving member 371a, a second movable seat 372a, a third cutting knife 374a, a second pressing block 373a, and a third elastic member 376a. The second pressing driving member 371a is arranged on the mounting seat 31a and is drivingly connected to the second movable seat 372a, so as to drive the second movable seat 372a to move along the second direction. The third cutting knife 374a serves as the above-mentioned second cutting end and is mounted on the second movable seat 372a, so as to move along the second direction with the second movable seat 372a.

The second pressing block 373a serves as the second pressing end and is movably connected to the second movable seat 372a along the second direction. The third elastic member 376a abuts between the second pressing block 373a and the second movable seat 372a, so as to provide a preload force that makes the second pressing block 373a have a tendency to move towards the second adsorption seat 22a. Optionally, the second pressing driving member 371a can be an air cylinder, and the third elastic member 376a can adopt a spring.

In this way, when the moving seat 11a is located at the first position and the starting end of the second material strip needs to be pressed tightly and cut off, the second pressing driving member 371a drives the second movable seat 372a to move towards the second adsorption seat 22a along the second direction. Firstly, the second pressing block 373a contacts the second material strip and presses the second material strip onto the second adsorption seat 22a tightly; as the second movable seat 372a continues to move towards the second adsorption seat 22a, the third cutting knife 374a contacts the second material strip and cuts it off.

Furthermore, the second pressing assembly 37a further includes a fifth guiding sleeve and a fifth guiding rod 375a. The fifth guiding sleeve is mounted on the second movable seat 372a, and the fifth guiding rod 375a is slidably cooperated with the fifth guiding sleeve, and one end of the fifth guiding rod 375a is fixedly connected to the second pressing block 373a. A longitudinal direction the fifth guiding rod 375a is parallel to the second direction. In this way, a movement of the second pressing block 373a along the second direction is guided by sliding cooperation of the fifth guiding rod 375a and the fifth guiding sleeve.

Please refer to FIG. 9 and FIG. 12, following is a description of a roll replacing process of the roll replacing apparatus with the moving seat 11a being located at the first position, the starting end of the second material strip unwound and output by the second unwinding assembly 122a being cut off by the third cutting knife 374a and being pressed onto the second adsorption seat 22a (see FIG. 10) tightly by the second pressing block 373a, and the second material strip unwound and output by the first unwinding assembly 121a passing between the first adsorption seat 21a and the tape adsorption block 321a and being transported downstream as an initial state:

When unwinding of the material rolls on the first unwinding assembly 121a is completed and roll replacing is required, firstly, the tape adsorption block 321a is driven to move downward under a driving force of the tape adsorption driving member 332*a* until the first material strip aa is pressed onto the first adsorption seat 21*a* tightly.

Then, the tape-cutting driving member 333*a* drives the cutting-knife seat 334*a* to move downward, making the tape-pressing block 332*a* press the first material strip aa onto the first supporting seat 211*a* tightly; as the cutting-knife seat 334*a* continues to move downward, the first cutting knife 331*a* cuts off the first material strip aa at a position between the tape-pressing block 332*a* and the tape adsorption block 321*a*. After the first material strip aa is cut off, the tape-cutting driving member 333*a* drives the cutting-knife seat 334*a* to move upward to reset.

And then, the cut-off end of the first material strip aa is adsorbed by the tape adsorption block 321*a*, and the tail end of the first material strip aa is pressed onto the first transporting roller 40*a* tightly by the tape-pressing roller 351*a*. The tape adsorption driving member 322*a* drives the tape adsorption block 321*a* to move upward to reset. The second pressing driving member 371*a* drives the second movable seat 372*a* to move upward to reset, making the second pressing block 373*a* release the pressing of the second material strip (at this time, the second adsorption seat 22*a* can restore adsorption of the second material strip). the roll-replacing driving member 60*a* drives the moving seat 11*a* to move to the second position.

And then, the tape adsorption driving member 322*a* drives the tape adsorption block 321*a* to move downward until the cut-off end of the first material strip aa and the starting end of the second material strip are tightly pressed onto the second adsorption seat 22*a* (at this time, the second adsorption seat 22*a* can discontinue the adsorption of the second material strip), making the cut-off end of the first material strip aa and the starting end of the second material strip be pasted to each other.

And then, the anti-pasting driving member 343*a* drives the roller seat 342*a* to move downward until the anti-pasting roller 341*a* presses the cut-off end of the first material strip aa tightly. The tape adsorption block 321*a* releases the adsorption of the first material strip aa, and the tape adsorption driving member 322*a* drives the tape adsorption block 321*a* to move upward to reset, making the tape adsorption block 321*a* be separated from the first material strip aa.

And then, the second material strip serving as a working material strip is transported downstream. The anti-pasting roller 341*a* rolls a pasting position of the starting end of the second material strip and the cut-off end of the first material strip aa during the transporting process, making the pasting of the first material strip aa and the second material strip more reliable. After the pasting position passes through the anti-pasting roller 341*a*, the anti-pasting driving member 343*a* drives the roller seat 342*a* to move upward to reset, so that the anti-pasting roller 341*a* is driven to be separated from the second material strip. It should be noted that in other embodiments, after the tape adsorption block 321*a* moves upward and is separated from the first material strip aa, the anti-pasting driving member 343*a* can immediately drive the roller seat 342*a* to move upward to reset, thereby driving the anti-pasting roller 341*a* to separate from the first material strip aa. At this time, the second material strip is transported downstream as the working material strip.

The material rolls on the first unwinding assembly 121*a* is replaced, and the starting end of the first material strip aa unwound and output by the first unwinding assembly 121*a* is pressed onto the first adsorption seat 21*a* tightly by the first pressing block 363*a* and is cut to be smooth by the second cutting knife 364*a*, which is prepared for the roll replacing for a next time. When unwinding of the material rolls on the second unwinding assembly 122*a* is completed, the steps of roll replacing are similar to the above-mentioned roll replacing steps, so it will not be repeated here.

Based on the above-mentioned roll replacing apparatus, a gluing device is further provided in the present application. The gluing device includes the roll replacing apparatus as described in any one of the above-mentioned embodiments. Specifically, the gluing device further includes a glue preparation device and a gluing device. The glue preparation device is used to receive tape tapes output from the roll replacing apparatus and cut the tape tapes to films with a preset length. The gluing device is used to paste the films to a specified position.

The technical features of the above-mentioned embodiments can be combined arbitrarily. In order to simplify the description, all possible combinations of the technical features in the above-mentioned embodiments are not described. However, as long as there is no contradiction in the combination of these technical features, it should be considered as a scope of this description.

The above-mentioned embodiments only express several embodiments of the present application, and the description is more specific and detailed, but it cannot be understood as a limitation on the scope of the present application. It should be noted that for those skilled in the art, several modifications and improvements can be made without departing from a concept of the present application, which belong to a protective scope of the present application. Therefore, the protective scope of the present application shall be subject to the appended claims.

What is claimed is:

1. A roll replacing apparatus, comprising:
   an unwinding assembly is used to unwind and output a first material strip and a second material strip downstream; and
   a roll replacing assembly arranged downstream of the unwinding assembly and comprising a first adsorption mechanism, a second adsorption mechanism, and a cutting mechanism; the first adsorption mechanism comprises a first adsorption unit, and the first adsorption unit and the second adsorption mechanism are arranged along a first direction and are configured such that at least one of them is able to approach or move away from another one along the first direction;
   one side of the first adsorption unit facing the second adsorption mechanism is provided with a first adsorption area and a second adsorption area arranged along a second direction perpendicular to the first direction; the first adsorption area is used to adsorb the first material strip, and the second adsorption area is used to adsorb the second material strip; and the first adsorption unit is further configured to be movable along the second direction, and in a process of the first adsorption unit moving along the second direction, the first adsorption area and the second adsorption area are alternately alignable with the second adsorption mechanism in the first direction; and
   the cutting mechanism is arranged upstream of the second adsorption mechanism and is used to cut off the first material strip between the second adsorption mechanism and the first adsorption area or the second material strip between the second adsorption mechanism and the second adsorption area.

2. The roll replacing apparatus as claimed in claim 1, wherein the first adsorption unit comprises a first adsorption seat, and the second adsorption mechanism comprises a second adsorption seat; a first position and a second position are provided in the process of the first adsorption seat moving along the second direction;

when the first adsorption seat is located at the first position, the second adsorption seat is aligned with the first adsorption area in the first direction, and the cutting mechanism is used to cut off the first material strip clamped tightly by the first adsorption seat and the second adsorption seat approaching each other along the first direction, and the second adsorption seat is able to adsorb the cut-off first material strip; and when the first adsorption seat is located at the second position, the second adsorption seat is aligned with the second adsorption area in the first direction, and the cutting mechanism is used to cut off the second material strip clamped tightly by the first adsorption seat and the second adsorption seat approaching each other along the first direction, and the second adsorption seat is able to adsorb the cut-off second material strip.

3. The roll replacing apparatus as claimed in claim 2, wherein one side of the first adsorption seat facing the second adsorption seat is further provided with a third adsorption area and a fourth adsorption area; the third adsorption area is located upstream of the first adsorption area, and the fourth adsorption area is located upstream of the second adsorption area;

when the first adsorption seat is located at the first position, the cutting mechanism is able to cut off the first material strip at a position between the first adsorption area and the third adsorption area; and when the first adsorption seat is located at the second position, the cutting mechanism is able to cut off the second material strip at a position between the second adsorption area and the fourth adsorption area.

4. The roll replacing apparatus as claimed in claim 2, wherein the roll replacing assembly further comprises a first strip-pressing mechanism and a second strip-pressing mechanism; the first strip-pressing mechanism has a first material-pressing end retractable along the first direction, and the second strip-pressing mechanism has a second material-pressing end retractable along the first direction;

when the first adsorption seat is located at the first position, the first material-pressing end is used to press the second material strip onto the second adsorption area tightly; and when the first adsorption seat is located at the second position, the second material-pressing end is used to press the first material strip onto the first adsorption area tightly.

5. The roll replacing apparatus as claimed in claim 4, wherein the roll replacing assembly further comprises a first cut-off knife arranged on the first strip-pressing mechanism and a second cut-off knife arranged on the second strip-pressing mechanism; and the first cut-off knife is used to cut off a starting end of the second material strip pressed tightly on the second adsorption area by the first material-pressing end; and the second cut-off knife is used to cut off a starting end of the first material strip pressed tightly on the first adsorption area by the second material-pressing end.

6. The roll replacing apparatus as claimed in claim 2, wherein the roll replacing assembly further comprises a mounting seat, and the second adsorption mechanism further comprises a lifting seat and a third driving member; the lifting seat is movably connected to the mounting seat along the first direction, and the second adsorption seat is connected to the lifting seat; and the third driving member is mounted on the mounting seat and is connected to the lifting seat by transmission.

7. The roll replacing apparatus as claimed in claim 6, wherein the cutting mechanism comprises a guiding seat, a cutter, and a fourth driving member; and the fourth driving member is mounted on the lifting seat or the mounting seat and is connected to the guiding seat by transmission to drive the guiding seat move along the first direction; and the cutter is mounted on the guiding seat; and in a process of the guiding seat moving along the first direction, the cutter is drivable to cut off the first material strip between the second adsorption seat and the first adsorption area or the second material strip between the second adsorption seat and the second adsorption area.

8. The roll replacing apparatus as claimed in claim 7, wherein the cutting mechanism further comprises a pressing block and an elastic member; the pressing block is movably connected to the guiding seat along the first direction and is located upstream of the cutter; and the elastic member is arranged between the pressing block and the guiding seat to provide a preload force that makes the pressing block have a tendency to approach the first adsorption seat along the first direction; and when the lifting seat approaches the first adsorption seat along the first direction, the pressing block is able to press the first material strip or the second material strip onto the first adsorption seat tightly.

9. The roll replacing apparatus as claimed in claim 1, wherein the roll replacing assembly further comprises a mounting seat, and the first adsorption mechanism further comprises a sliding seat and a first driving member; the sliding seat is movably connected to the mounting seat along the second direction, and the first adsorption unit is arranged on the sliding seat; and the first driving member is arranged on the mounting seat and is connected to the sliding seat by transmission.

10. The roll replacing apparatus as claimed in claim 9, wherein the first adsorption mechanism further comprises a second driving member; the first adsorption unit is movably connected to the sliding seat along the first direction, and the second driving member is fixedly arranged relative to the sliding seat and is connected to the first adsorption unit by transmission.

11. The roll replacing apparatus as claimed in claim 9, further comprising a connecting board, the connecting board is connected to the sliding seat; the unwinding assembly comprises a first unwinding mechanism and a second unwinding mechanism, the first unwinding mechanism is used to unwind and output the first material strip and the second unwinding mechanism is used to unwind and output the second material strip; and the first unwinding mechanism and the second unwinding mechanism are arranged on the connecting board along the second direction.

12. The roll replacing apparatus as claimed in claim 1, wherein the first adsorption unit comprises a first adsorption seat and a second adsorption seat arranged along the second direction; one side of the first adsorption seat facing the second adsorption mechanism has the first adsorption area, and one side of the second adsorption seat facing the second adsorption mechanism has the second adsorption area.

13. The roll replacing apparatus as claimed in claim 12, wherein the roll replacing assembly further comprises a mounting seat, and the second adsorption mechanism comprises a tape adsorption driving member and a tape adsorption block; the tape adsorption driving member is arranged on the mounting seat and is drivingly connected to the tape adsorption block; and the tape adsorption driving member is used to drive the tape adsorption block to approach or move away from the first adsorption seat or the second adsorption seat along the first direction.

14. The roll replacing apparatus as claimed in claim 13, wherein the roll replacing apparatus further comprises an anti-pasting assembly, and the anti-pasting assembly comprises a roller seat and an anti-pasting roller; the roller seat is movably connected to the mounting seat along the first direction, and the anti-pasting roller is rotatably connected to the roller seat and is located upstream and/or downstream of the tape adsorption block; and the roller seat is able to move to a pressing position along the first direction, and when the roller seat moves to the pressing position, the anti-pasting roller presses a material strip on the first adsorption seat or the second adsorption seat tightly.

15. The roll replacing apparatus as claimed in claim 13, wherein the roll replacing assembly further comprises a mounting seat, and the roll replacing apparatus further comprises a cut-off assembly having a tape-cutting driving member, a cutting-knife seat, and a first cutting knife; and the tape-cutting driving member is arranged on the mounting seat and is drivingly connected to the cutting-knife seat to drive the cutting-knife seat to move along the first direction; the tape adsorption block is located at a downstream side of the cut-off assembly; and the first cutting knife is mounted on the cutting-knife seat and is located upstream of the tape adsorption block; and in a process of the cutting-knife seat moving along the first direction, the first cutting knife is able to be driven to cut off the first material strip on the first adsorption seat or the second material strip on the second adsorption seat.

16. The roll replacing apparatus as claimed in claim 15, wherein an upstream side of the first adsorption seat is connected with a first supporting seat, and an upstream side of the second adsorption seat is connected with a second supporting seat;

the cut-off assembly further comprises a tape-pressing block and a first elastic member; and the tape-pressing block is movably connected to the cutting-knife seat along the first direction; and the first elastic member abuts between the tape-pressing block and the cutting-knife seat; and the first adsorption unit is able to switch between a first position and a second position alternately when moving along the second direction; when the first adsorption unit is located at the first position, the second adsorption mechanism is opposite to the first adsorption seat in the first direction, and the tape-pressing block is opposite to the first supporting seat in the first direction; and when the first adsorption unit is located at the second position, the second adsorption mechanism is opposite to the second adsorption seat in the first direction, and the tape-pressing block is opposite to the second supporting seat in the first direction.

17. The roll replacing apparatus as claimed in claim 16, wherein a first cutting groove for the first cutting knife to cut into is defined between the first supporting seat and the first adsorption seat; and a second cutting groove for the first cutting knife to cut into is defined between the second supporting seat and the second adsorption seat.

18. The roll replacing apparatus as claimed in claim 12, wherein the roll replacing apparatus further comprises a mounting seat, and a first pressing assembly and a second pressing assembly both arranged on the mounting seat, and the first pressing assembly and the second pressing assembly are located at two sides of the second adsorption mechanism along the second direction respectively; the first pressing assembly has a first pressing end movable along the first direction, and the second pressing assembly has a second pressing end movable along the first direction; and the first adsorption unit is able to switch between a first position and a second position alternately when moving along the second direction; when the first adsorption unit is located at the first position, the second adsorption mechanism is opposite to the first adsorption seat in the first direction, and the second pressing end is opposite to the second adsorption seat in the first direction; and when the first adsorption unit is located at the second position, the second adsorption mechanism is opposite to the second adsorption seat in the first direction, and the first pressing end is opposite to the first adsorption seat in the first direction.

19. The roll replacing apparatus as claimed in claim 12, wherein the unwinding assembly comprises a moving seat and the first adsorption mechanism fixed relative to the moving seat; the roll replacing apparatus further comprises a mounting seat, a base, and a roll-replacing driving member; the mounting seat is connected to the base, and the moving seat is movably connected to the base along the second direction; and the roll-replacing driving member is arranged on the base and is drivingly connected to the moving seat.

20. A winding device, comprising the roll replacing apparatus as claimed in claim 1.

\* \* \* \* \*